US008571980B1

(12) United States Patent
Greenwood

(10) Patent No.: US 8,571,980 B1
(45) Date of Patent: Oct. 29, 2013

(54) SYSTEM, METHOD AND COMPUTER PROGRAM PRODUCT FOR TRANSFERRING MONEY

(75) Inventor: Susan Greenwood, Campbell, CA (US)

(73) Assignee: Stragent, LLC, Longview, TX (US)

( * ) Notice: Subject to any disclaimer, the term of this patent is extended or adjusted under 35 U.S.C. 154(b) by 1063 days.

(21) Appl. No.: 11/444,930

(22) Filed: May 31, 2006

Related U.S. Application Data

(60) Provisional application No. 60/686,606, filed on Jun. 1, 2005.

(51) Int. Cl.
*G06Q 40/00* (2012.01)

(52) U.S. Cl.
USPC .......................................................... 705/39

(58) Field of Classification Search
USPC .......................................................... 705/39
See application file for complete search history.

(56) References Cited

U.S. PATENT DOCUMENTS

| | | | | |
|---|---|---|---|---|
| 5,903,881 | A * | 5/1999 | Schrader et al. | 705/42 |
| 6,814,282 | B2 * | 11/2004 | Seifert et al. | 235/379 |
| 6,871,232 | B2 * | 3/2005 | Curie et al. | 709/225 |
| 7,200,551 | B1 * | 4/2007 | Senez | 705/40 |
| 7,395,241 | B1 | 7/2008 | Cook et al. | |
| 8,126,792 | B2 | 2/2012 | Gallagher et al. | |
| 8,152,054 | B2 | 4/2012 | Bulawa et al. | |
| 2002/0116341 | A1 * | 8/2002 | Hogan et al. | 705/64 |
| 2002/0128967 | A1 | 9/2002 | Meyer et al. | |
| 2003/0158811 | A1 | 8/2003 | Sanders et al. | 705/39 |
| 2005/0222957 | A1 | 10/2005 | Understein | 705/43 |
| 2009/0319425 | A1 | 12/2009 | Tumminaro et al. | |

FOREIGN PATENT DOCUMENTS

| | | |
|---|---|---|
| WO | 01/29637 | 4/2001 |
| WO | WO 01/39096 | 5/2001 |
| WO | WO 01/67364 | 9/2001 |
| WO | 2004/008288 | 1/2004 |

OTHER PUBLICATIONS https://www.paypal.com.
http://www.paypal.com/cgi-bin/webscr?cmd=p/dmo/demo_sm_1-outside.
https://www.paypal.com/cgi-bin/webscr?cmd=p/dmo/demo_sm_3-outside.
http://www.paypal.com/cgi-bin/webscr?cmd=p/req/index-outside.
https://www.paypal.com/cgi-bin/webscr?cmd=p/dmo/demo_sm_5-outside.
https://www.paypal.com/cgi-bin/webscr?cmd=p/dmo/demo_sm_6-outside.
https://www.paypal.com/cgi-bin/webscr?cmd=xpt/bizui/WhatIsPayPal-outside.

* cited by examiner

*Primary Examiner* — Hani M Kazimi
*Assistant Examiner* — Hatem M Ali
(74) *Attorney, Agent, or Firm* — Patrick E. Caldwell, Esq.; The Caldwell Firm, LLC

(57) ABSTRACT

A system, method and computer program product are provided for transferring money. In use, requests from a plurality of senders are received utilizing a network. Each request is utilized for transferring money from a first account associated with a corresponding sender to a single second account associated with the receiver. In addition, a queue of the requests is displayed to the receiver. Further, the money is transferred to the single second account. The first account and the single second account are each associated with at least one first entity independent from a second entity that receives the requests and displays the queue of such requests.

119 Claims, 23 Drawing Sheets

Confirm Your Transaction

Date Time Stamp     Acct #

Amount to be Debited
From Your Account    $ [ 100.00 ]    help

[ Go Back ]  [ Confirm ]

Transaction #

Completed Transactions

View From: 1 / 1 / 2005    To: 12 / 31 / 2005

| Acct # | Date/Time | TX # | MIN™ | Amount | Memo |
|---|---|---|---|---|---|

All acct #s

[Help]  [Print]  [Get Info]

FIGURE 16

SYSTEM, METHOD AND COMPUTER PROGRAM PRODUCT FOR TRANSFERRING MONEY

RELATED APPLICATION(S)

The present application claims priority of a provisional application filed Jun. 1, 2005 under Ser. No. 60/686,606, which is incorporated herein by reference in its entirety.

FIELD AND BACKGROUND OF THE INVENTION

The present invention relates to systems for transferring money between accounts, and more particularly to transferring money between accounts without divulging confidential information.

SUMMARY

A system, method and computer program product are provided for transferring money. In use, requests from a plurality of senders are received utilizing a network. Each request is utilized for transferring money from a first account associated with a corresponding sender to a single second account associated with the receiver. In addition, a queue of the requests is displayed to the receiver. Further, the money is transferred to the single second account. The first account and the single second account are each associated with at least one first entity independent from a second entity that receives the requests and displays the queue of such requests.

BRIEF DESCRIPTION OF THE DRAWINGS

FIG. 13 shows a graphical user interface for confirming a money transfer, in accordance with yet another embodiment.

FIG. 16 shows a graphical user interface for displaying a history of completed money transfers, in accordance with yet another embodiment.

DETAILED DESCRIPTION

Figure 1:
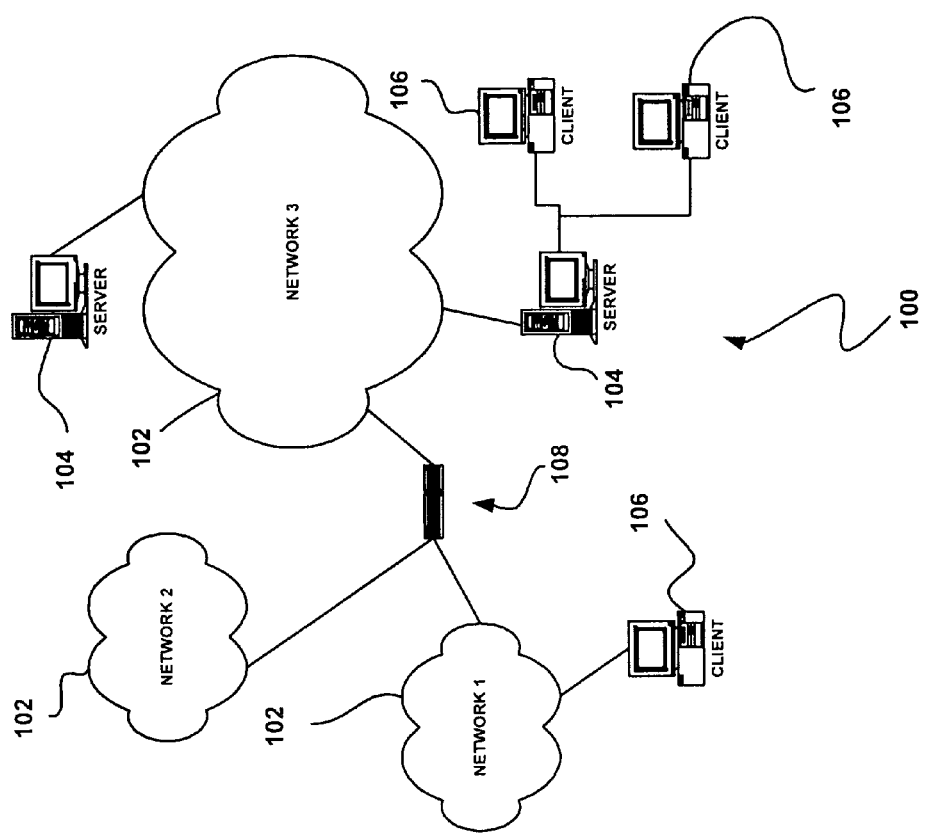
FIG. 1 illustrates a network architecture, in accordance with one embodiment

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway or router 108 is optionally coupled therebetween.

Figure 2:
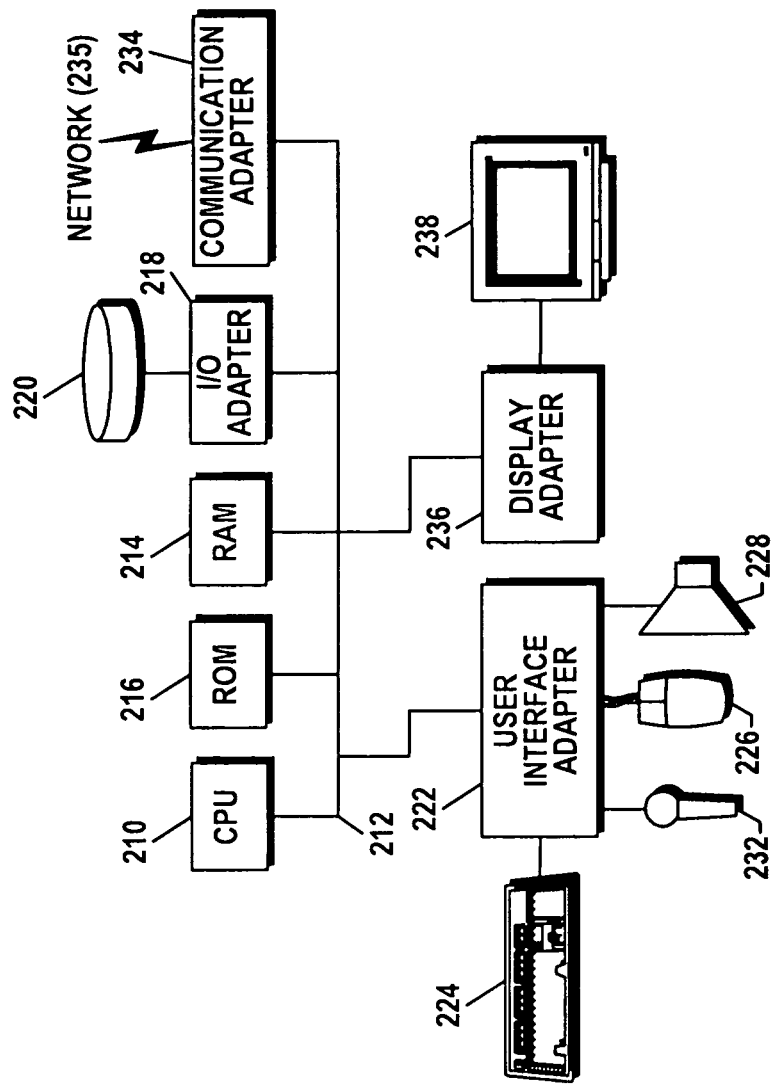
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
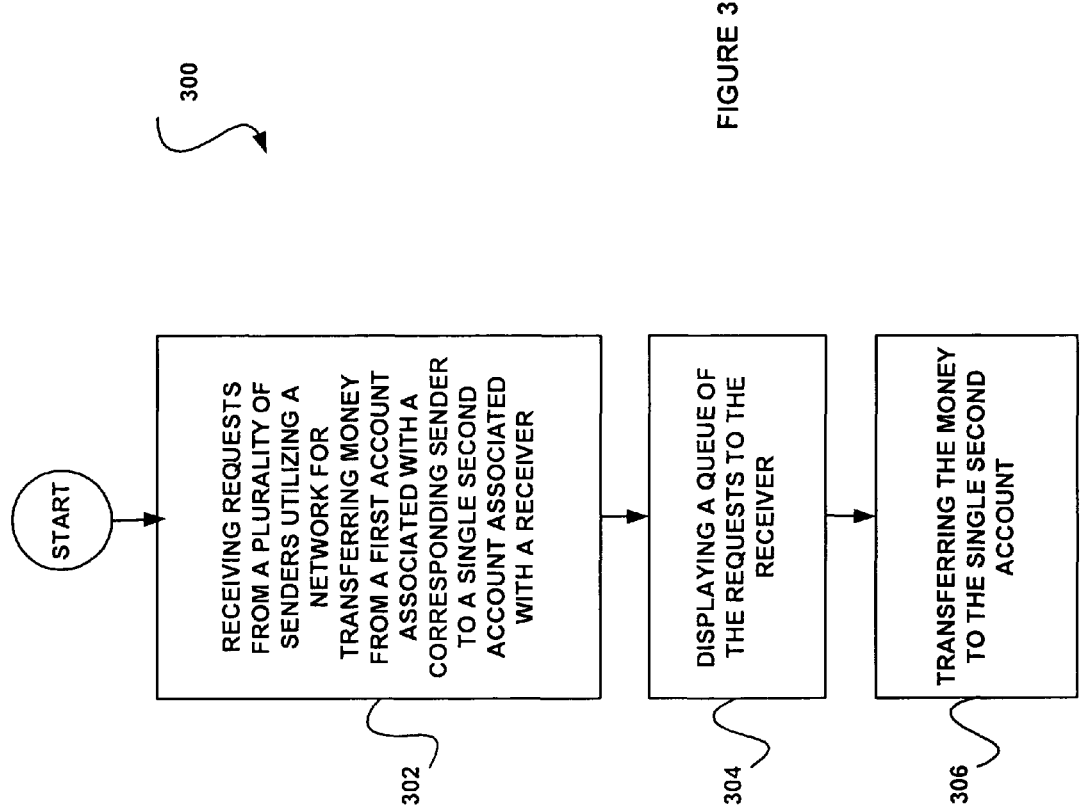
FIG. 3 shows a method for transferring money, in accordance with one embodiment.

FIG. 3 shows a method 300 for transferring money, in accordance with one embodiment. As an option, the present method 300 may be implemented in the context of the architecture and environment of FIGS. 1 and/or 2. Of course, however, the method 300 may be carried out in any desired environment. Further, the aforementioned definitions may equally apply to the description below.

As shown in operation 302, requests from a plurality of senders are received utilizing a network, where each request is utilized for transferring money from a first account associated with a corresponding sender to a single second account associated with the receiver. The requests may be received from any entity, including an entity that processes the requests or an external entity.

Thus, the requests may include requests to transfer money. Further, such requests may identify a receiver of the request via a pseudo account identifier associated with the receiver, an amount of money to be transferred to the receiver, an originating account associated with the sender from which the money is to be transferred, and/or any other information capable of being associated with the transfer of money. In addition, the request may optionally include a message, an attached document, etc., as will become apparent hereinafter.

Further, the requests may optionally include automatic or manually initiated requests. Just by way of example, a request may be initiated by a sender utilizing an automatic bill-pay feature associated with an account. As another example, a request may be initiated by a user logging in to an interface capable of allowing the user to manually initiate the request. Of course, it should be noted that the requests may be initiated in any desired manner.

The plurality of senders may include an individual, a business, a government entity and/or any other type of sender capable of requesting a money transfer. The receiver may also include an individual, a business, a government entity and/or any other receiver capable of receiving a money transfer. In addition, the requests may be received from the sender utilizing any type of network, such as for example the network described above with respect to FIG. 1.

Still yet, the pseudo account identifier may include any identifier capable of being associated with a receiver. For instance, the pseudo account identifier may be associated with the single second account of the receiver. Of course, the pseudo account identifier may optionally be one of a plurality of pseudo account identifiers associated with the single second account of the receiver. In some embodiments, the pseudo account identifier may have only a single purpose. Specifically, in such optional embodiments, it may only serve to transfer money from the first account associated with the corresponding sender to the single second account associated with the receiver (without serving as an e-mail address, or any other purpose, etc.).

For instance, the pseudo account identifier may include an alias of an actual identifier utilized by an entity providing the account, to identify the account of the receiver. As another option, the pseudo account identifier may be customized by an associated receiver. Thus, a receiver may generate pseudo account identifiers and may further associate such pseudo account identifiers with at least one account associated with the receiver. Furthermore, the first account and/or single second account may include a bank account, a credit card account and/or any other type of account capable of sending and/or receiving money.

A queue of the requests may then be displayed to the receiver, as shown in operation 304. The queue of requests may be displayed to the receiver utilizing a graphical user interface, for example. In addition, the queue may include any data structure capable of storing and/or displaying the requests. For instance, the requests may be displayed on a first-in-first-out basis, such that requests made first may be displayed first in a list of requests. Of course, such requests may be prioritized for transfer and displayed in any desired manner.

The queue may be associated with the single second account of the receiver. Further, such queue may optionally be associated with a single pseudo account identifier. In this way, a plurality of queues may be utilized to store and/or display requests to the receiver, where each queue is associated with a single account of the receiver. In addition, a master queue may also be associated with a plurality of accounts, such that the master queue may display requests associated with a plurality of accounts of a receiver. In particular, the master queue may display requests associated with sub-queues, where such sub-queues are each associated with an account of the receiver As another option, a plurality of queues may be displayed, such that the requests may be displayed in the plurality of queues. Furthermore, each of the plurality of queues may be assigned a unique identifier, such that each of the requests may be assigned to a particular queue based on the unique identifier. In some embodiments, each of the queues may also be associated with a single pseudo account identifier. The requests may further be displayed in a queue with associated information. Just by way of example, such information may include a name of the sender associated with the request (e.g. an identifier of the sender, an anonymous status of the sender, etc.), an address of the sender, an amount of money associated with the request, a message, a timestamp of the request, a gift icon associated with the request, and/or any other type of information capable of being associated with a request.

As shown in operation 306, money associated with the request may be transferred to the single second account associated with the receiver. The money may be transferred in any desired manner. In one exemplary embodiment, the money may be transferred utilizing an automated clearinghouse (ACH).

For example, a debit batch file of the received requests (e.g. ACH messages) may be generated at an entity receiving the requests. Of course it should be noted that the debit batch file may not be limited to identifying requests to send money, but may optionally also include requests to receive money. The debit batch file may then be transmitted to an originating depository financial institution (ODFI) which may validate the debit batch file and transmit the debit batch file to an ACH operator (e.g. Federal Reserve Banks, etc.). The ACH operator may identify the requests in the debit batch file and transmit such requests to receiving depository financial institutions (RDFIs) associated with senders issuing the requests (e.g. the entities through which the sender is requesting the transfer of money).

Each RDFI may then send the requested money to the ACH operator which may forward the requested money to the ODFI. The entity receiving the requests may also transmit a credit batch file to the ODFI. The credit batch file may identify where the requested money is to be sent. For instance, the credit batch file may identify the receivers associated with the requested money. Again, it should be noted that the credit batch file may not be limited to requests to receive money, but may optionally also include requests to send money.

Once the ODFI has the requested money, the ODFI may transmit the credit batch file and the requested money to the ACH operator. The ACH operator may then identify the receivers in the credit batch file and may accordingly transmit the requested money to the appropriate RDFIs associated with the receivers. In this way, money may be transferred from an account of a sender to an account of a receiver upon a money transfer request issued by the sender. Such money transfer may optionally be a direct transfer between the sender's account and the receiver's account or may be transferred utilizing any number of intermediary accounts. Of course, such example is set forth for illustrative purposes only and should not be construed as limiting in any manner whatsoever, as any transfer mechanism may be utilized.

As an option, the money may be transferred in response to an acceptance received from the receiver utilizing the network. Thus, a receiver may be required to accept a money transfer prior to the initiation of the actual transfer. As another option, a request to transfer money may be dismissed if the acceptance is not received within a predetermined amount of time. As still yet another option, the transfer may be carried out automatically.

Additionally, the first account and the single second account may each be associated with at least one first entity independent (e.g. separate, etc.) from a second entity that performs the receiving and the displaying. Thus, the first account associated with the sender and the single second account associated with the receiver may each be associated with a different or same entity (e.g. bank, credit card company, etc.). Furthermore, the entity associated with the first account and the entity associated with the single second account may each be independent from an entity that receives requests from users to transfer money, and that displays such requests to associated receivers.

In this way, the entity that is separate from those that send and/or receive money on behalf of associated senders and receivers may be utilized to receive requests with pseudo account identifiers and to display such requests to receivers according to their associated pseudo account identifiers. In addition, the pseudo account identifiers may be publicly distributed to safely send and/or receive money transfers utilizing the separate entity without any risk of exposing an actual account identifier. Still yet, the method 300 may be integrated with financial management programs (e.g. Quicken®, etc.) for management of money transfers.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Further, any of the following features may be optionally incorporated with or without the exclusion of other features described.

Figure 4:
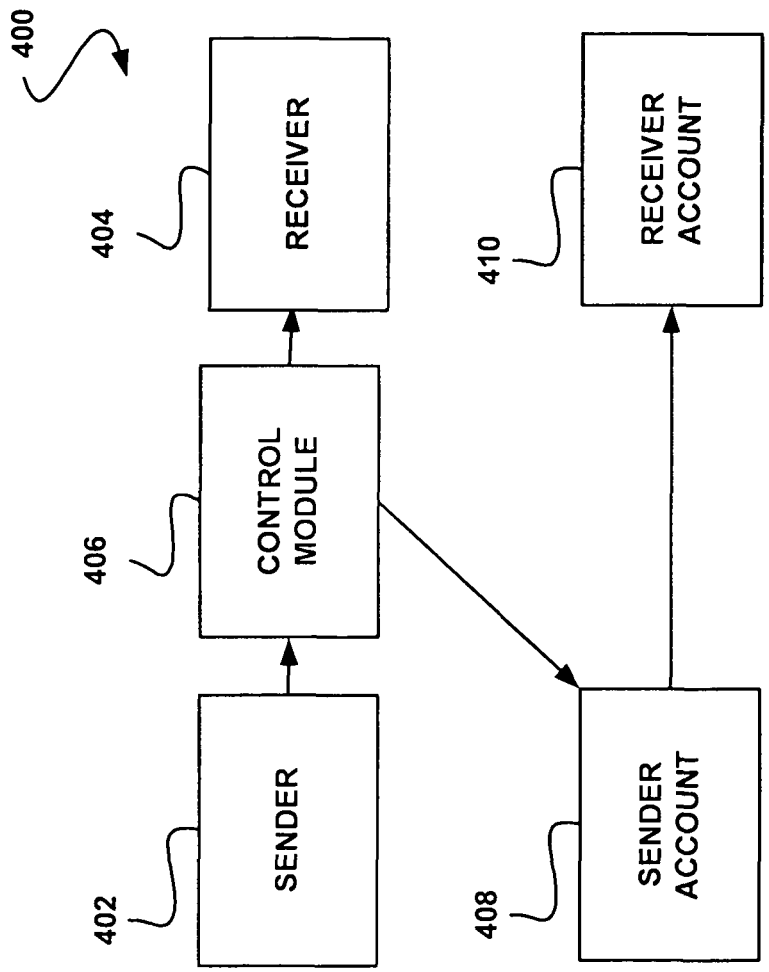
FIG. 4 shows a system for transferring money utilizing pseudo account identifiers, in accordance with another embodiment.

FIG. 4 shows a system 400 for transferring money utilizing pseudo account identifiers, in accordance with another embodiment. As an option, the present system 400 may be implemented in the context of the architecture and environment of FIGS. 1-3. Of course, however, the system 400 may be carried out in any desired environment. Further, the aforementioned definitions may equally apply to the description below.

As shown, a sender 402 sends a request to transfer money to a control module 406. The request may include a pseudo account identifier associated with an intended receiver and a monetary amount to be transferred to the receiver. The control module may include any software application or any other type of computer code capable of facilitating a money transfer in the manner described herein. Specifically, the control module 406 may be capable of storing and/or retrieving data associated with sender and/or receiver accounts. For instance, the control module 406 may be capable of associating a pseudo account identifier received in a request with an actual account identifier (e.g. an account identifier utilized by a financial institution to identify accounts associated therewith), where such actual account identifier may be utilized to request a credit and/or debit of money from the account.

The control module 406 may receive the request and utilize the pseudo account identifier associated with the request to identify an actual account identifier. The control module 406 may also utilize the pseudo account identifier associated with the request to identify other information corresponding to the actual account. Once the actual account is identified, the control module 406 may send a notification to the receiver 404 informing the receiver of the pending money transfer. The control module 406 may optionally wait to initiate the transfer of money until the receiver 404 accepts the pending transfer. The control module 406 may then initiate the transfer of money from the sender's account 408 to the receiver's account 410 for the amount of money identified in the request.

Figure 5:
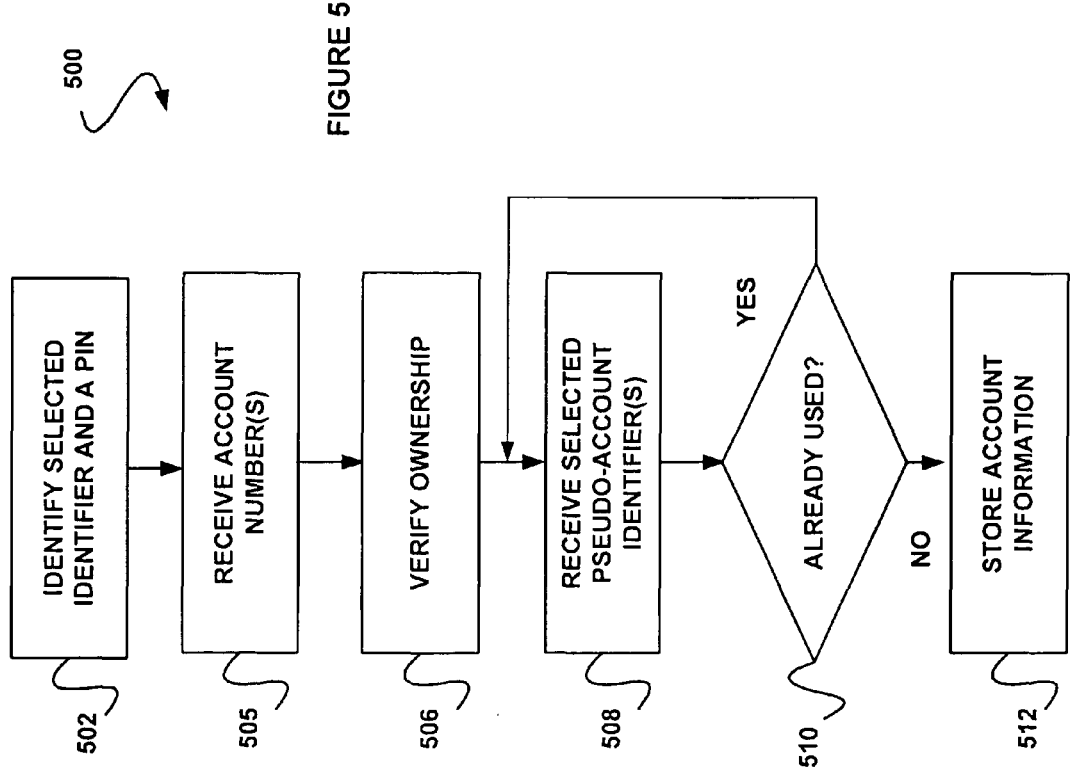
FIG. 5 shows a method for creating a user account that utilizes pseudo account identifiers, in accordance with yet another embodiment.

FIG. 5 shows a method 500 for creating a user account that utilizes pseudo account identifiers, in accordance with yet another embodiment. As an option, the present method 500 may be implemented in the context of the architecture and environment of FIGS. 1-4. Of course, however, the method 500 may be carried out in any desired environment. Further, the aforementioned definitions may equally apply to the description below.

As shown in operation 502, an identifier and a personal identifier (e.g. PIN) are selected by a user. Such identifier may include any sequence of characters capable of identifying the user. The PIN may also include any sequence of characters capable of being utilized in combination with the identifier to uniquely identify a user account. Thus, the user may utilize the identifier and PIN as login information. Of course it should be noted that such login information may also include any additional identifying and/or authenticating information. For example, a second authentication identifier may also be utilized with respect to the login information. Once the user selects an identifier and a PIN, at least one account number may be received. Note operation 505. As an option, the at least one account number may be received utilizing an interface separate from an interface by which the identifier and personal identifier are received.

The account number may include any account associated with the user. Specifically, the account number may include an actual account identifier that identifies the account and routing information associated with an entity that provides the account to the user. Since a plurality of account numbers may be received in operation 505, it should be noted that the user account associated with the above described login data may be associated with a plurality of accounts associated with the user. In addition, the plurality of accounts may each be associated with different financial institutions.

The user may then be required to verify ownership of the account, as shown in operation 506. The user may verify ownership in any desired manner. Just by way of example, the user may verify ownership by providing a copy of a deposit slip and/or a monthly account statement, by identifying a correct nominal amount of money deposited into the account for verification purposes, by identifying a unique transaction code associated with a deposit of a predetermined amount of money, etc.

A pseudo account identifier may also be received, as in operation 508. Specifically, the pseudo account identifier may be received from the user. Further, the pseudo account identifier may be received utilizing an interface separate from the interface utilized to receive the at least one account number. For instance, the pseudo account identifier may be received by the user in association with a selection of a verified account. The pseudo account identifier received by the user may also be required to be in a predetermined format, such that an error notification may be sent to the user if the received pseudo account identifier does not match such format. As another option, the pseudo account identifier may be automatically generated.

As shown in decision 510, it may first be determined whether the received pseudo account identifier has already been assigned to any other account associated with the user or any other user. If the pseudo account identifier has not already been assigned to an account, then the pseudo account identifier may be stored in conjunction with the account number verified by the user. Note operation 512. In this way, pseudo account identifiers may be unique to accounts across a plurality of users. Thus, pseudo account identifiers may be created for public use in requesting money transfers to and/or from an associated account of the user without divulging the user's actual account information.

As an option, a statement may also be received from the user (not shown). The user may associate the statement with the user's account or may associate any number of different statements with any of the account numbers and/or pseudo account identifiers. The statement may include any type of statement that is text, audio or video. Thus, the statement may uniquely identify the user. Specifically, the statement may be utilized by senders of money transfers to confirm the identity of the user to which a money transfer is made. More detail with respect to such statement will be described in further detail with respect to FIG. 6.

Figure 6:
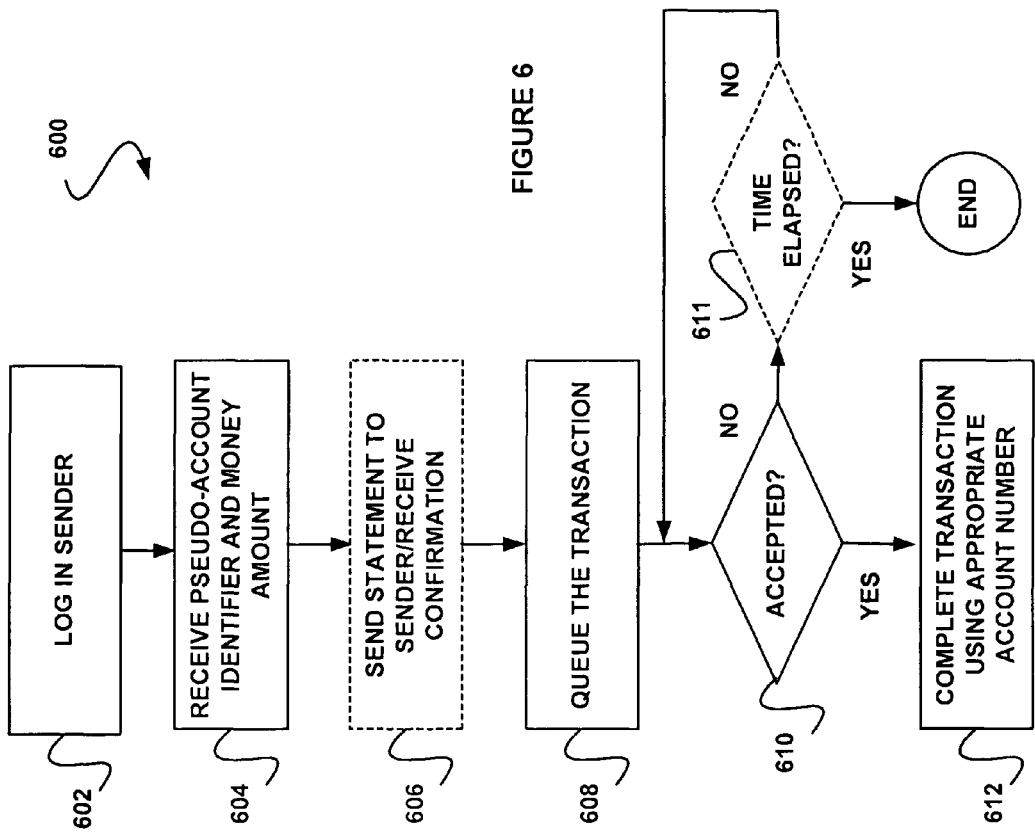
FIG. 6 shows a method for initiating the sending of money utilizing a pseudo account identifier, in accordance with still yet another embodiment.

FIG. 6 shows a method 600 for initiating the sending of money utilizing a pseudo account identifier, in accordance with still yet another embodiment. As an option, the present method 600 may be implemented in the context of the architecture and environment of FIGS. 1-5. Of course, however, the method 600 may be carried out in any desired environment. Further, the aforementioned definitions may equally apply to the description below.

As shown in operation 602, a sender logs in using sender log in data. The sender may be logged in utilizing an identifier and a pin that uniquely identifies a user account of the sender. The sender may also be required to enter a second authentication identifier in order to login. The sender may then select to transfer money to a receiver utilizing a graphical user interface (not shown). As an option, the sender may request to transfer the money anonymously. A pseudo account identifier and a monetary amount to be transferred may be received from the sender, as in operation 604.

The sender may then initiate the money transfer (not shown). A confirmation notification may optionally be sent to the sender such that the sender may confirm the money transfer, as shown in operation 606. For example, the confirmation may confirm the identity of the recipient and the monetary amount to be transferred. As an option, a statement associated with a verified receiver's account may be displayed to the sender initiating the money transfers in order for the sender to confirm that the correct receiver is associated with the particular pseudo account identifier entered in the money transfer request by the sender. Just by way of example, the statement may include the statement described above with respect to FIG. 5. Thus, the sender may be informed, by a receiver, of a statement to expect when initiating a transfer of money, thus providing the sender assurance that the pseudo account identifier to which the money is being transferred is accurate. Once the sender confirms the money transfer in operation 606, the money transfer request may be queued. Note operation 608.

Just by way of example, the request may be placed in a queue according to information associated with the request. For instance, the request may be placed in a queue based on the receiver associated with the request. Thus, a receiver's user account, and thus log in data, may be associated with one or a plurality of queues. Of course, the request may be placed in a queue based on a priority of the request and/or any other information capable of being associated with the request.

It may also be determined whether the request placed in the queue must be accepted by the receiver prior to being executed, as shown in decision 610. Such determination may be made based on account settings associated with the receiver. For instance, the receiver may specify that money may be transferred to the receiver's account only if the transfer has been accepted by the receiver. As another option, the receiver may specify that money may be automatically transferred, such that an acceptance by the receiver is not required. As yet another option, the receiver may specify specific senders that may automatically transfer money without requiring an acceptance by the receiver.

If it is determined in operation 610 that the receiver must accept the transfer prior to executing the transfer, then a notification is sent to the receiver requesting such acceptance. Optionally, if the receiver does not accept the transfer within a predetermined amount of time, then the transfer may be cancelled. Note decision 611. Cancellation of the transfer may include sending a notification to the sender regarding such cancellation.

Once it is determined in operation 610 that the money transfer may be executed, the money transfer is completed utilizing the actual account number associated with the pseudo account number included in the request. See operation 612. In this way, the money transfer may be made from a sender to a receiver utilizing a pseudo account identifier that may be publicly known without risk of exposing an actual account number of the receiver.

Figure 7:
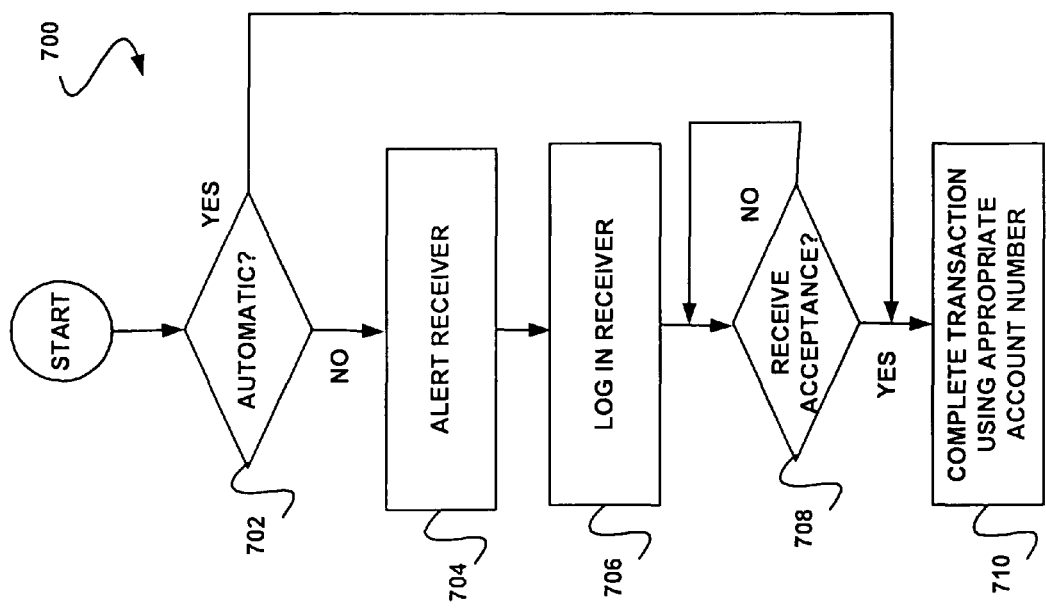
FIG. 7 shows a method for accepting a money transfer, in accordance with another embodiment.

FIG. 7 shows a method 700 for accepting a money transfer, in accordance with another embodiment. As an option, the present method 700 may be implemented in the context of the architecture and environment of FIGS. 1-6. Of course, however, the method 700 may be carried out in any desired environment. Further, the aforementioned definitions may equally apply to the description below.

Upon receipt of a request to transfer money from a sender, it is determined whether the money may be transferred automatically, as shown in decision 702. As described above with respect to FIG. 6, such determination may be made based on account settings associated with the receiver. If it is determined in decision 702 that the money transfer may be automatically executed, then the money transfer is completed using an account number associated with a pseudo account number included in the request. See operation 710.

If, however, it is determined in decision 702 that the money transfer may not be automatically executed, then a receiver associated with the request may be alerted of the pending transfer, as in operation 704. Such receiver may be alerted by sending a notification to a user account associated with the receiver. Of course the receiver may be alerted in any desired manner (e.g. email, phone, SMS message, notice on a website, etc.).

Once the receiver logs in to an associated user account using receiver log in data (e.g. an associated identifier, pin, second authentication identifier, etc.), as in operation 706, it may be determined whether the receiver accepts the pending transfer. Note operation 708. The method 700 continues to wait until the receiver responds to the pending transfer. For example, the receiver may accept, decline or select to delay such acceptance or declination of the pending transfer. Of course such method 700 may optionally cancel the pending transfer if the receiver does not respond to the transfer within a predetermined amount of time, as described above with respect to FIG. 6. Upon acceptance made by the receiver, the money transfer is completed using the account number associated with the pseudo account number included in the request, as in operation 710.

Figure 8:
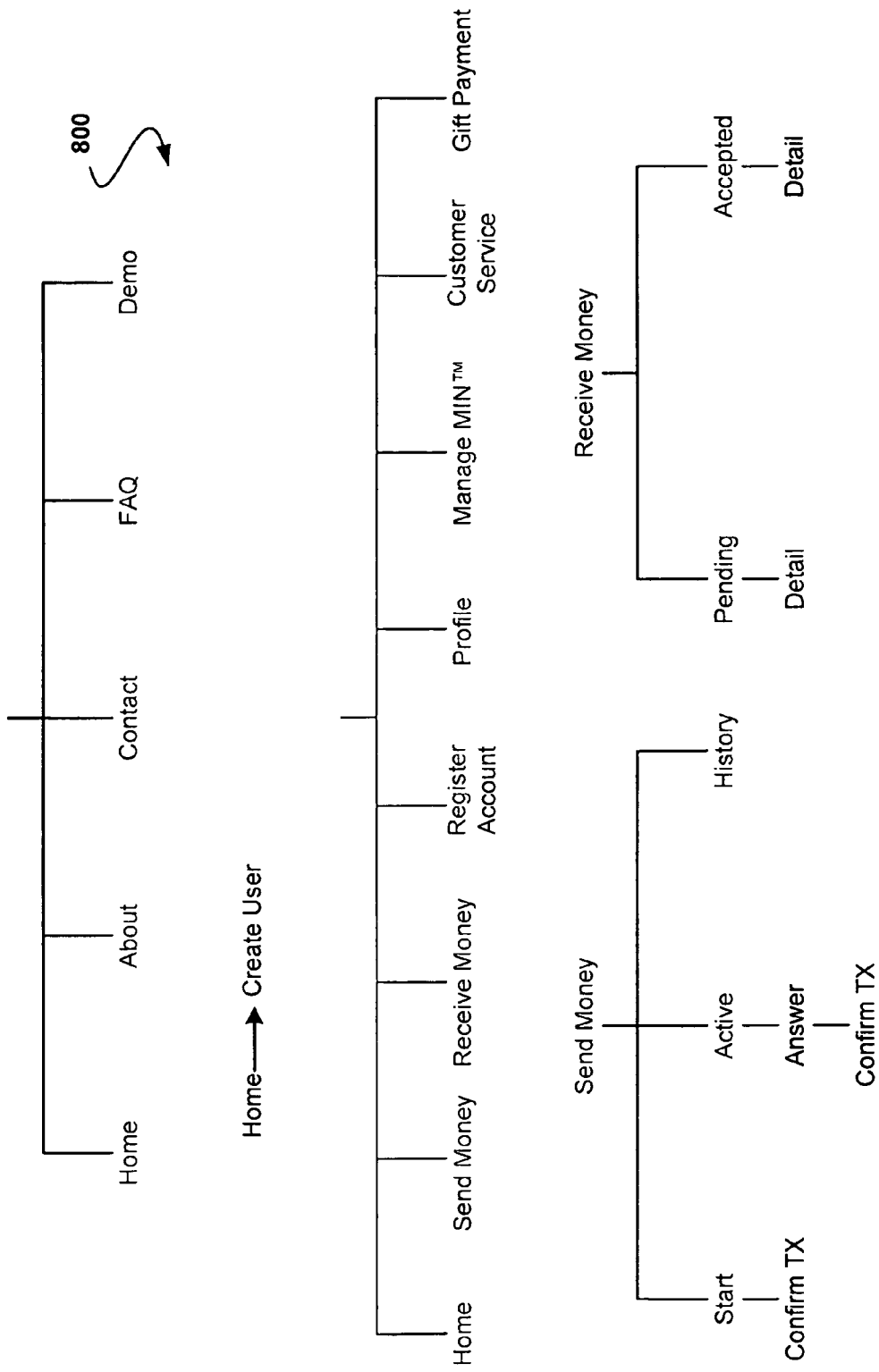
FIG. 8 shows a flow of graphical user interfaces utilized in an application for transferring money utilizing pseudo account identifiers

FIG. 8 shows a flow 800 of graphical user interfaces utilized in an application for transferring money utilizing pseudo account identifiers, in accordance with one embodiment. Specifically, the flow 800 may include a flow of menu options associated with the graphical user interface of a money transfer application. For instance, such money transfer application may include a web application, but of course may include any type of application capable of providing user accounts and the functionality to process money transfer requests. Examples of at least a portion of such graphical user interfaces will be described in more detail below.

Figure 9:
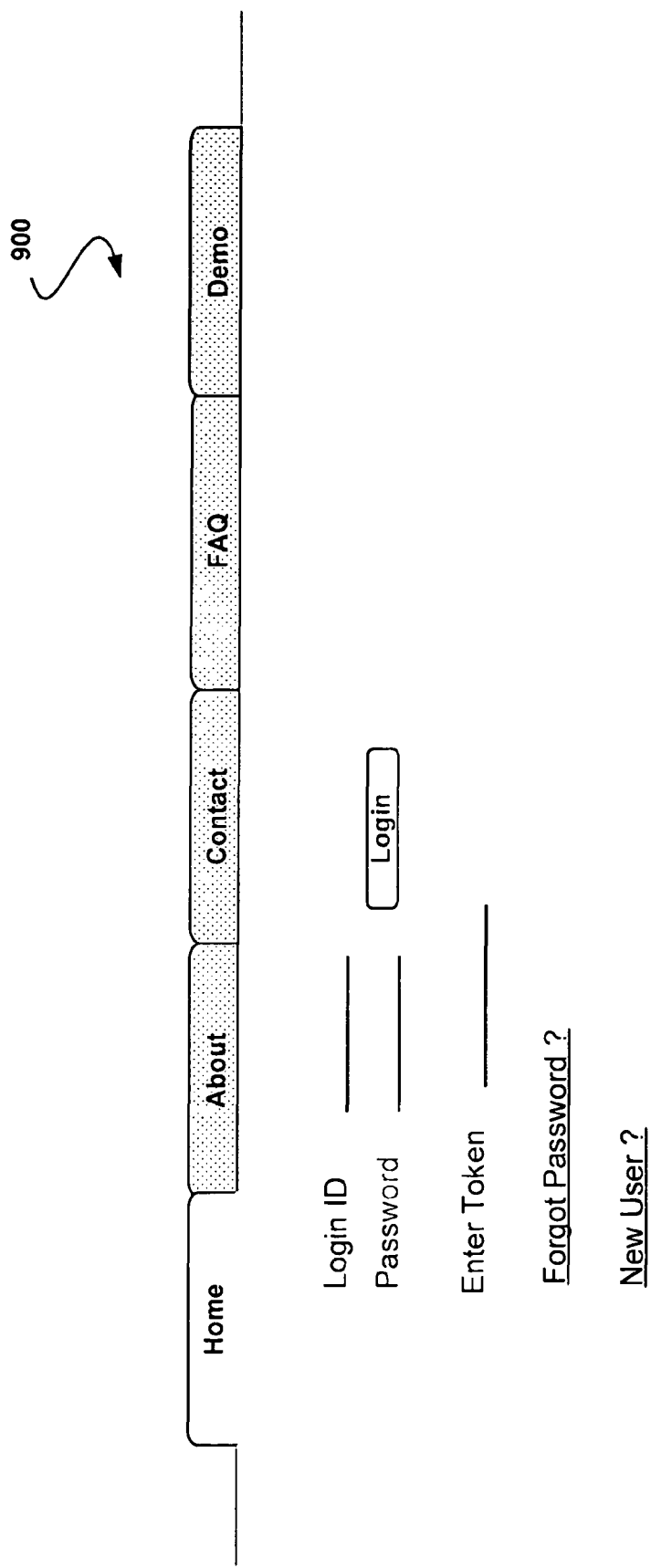
FIG. 9 shows a graphical user interface for logging in to a system utilized in transferring money utilizing pseudo account identifiers, in accordance with another embodiment.

FIG. 9 shows a graphical user interface (GUI) 900 for logging in to a system utilized in transferring money utilizing pseudo account identifiers, in accordance with another embodiment. As shown, the GUI 900 may provide fields for a user to enter an identifier, an associated password (e.g. pin, etc.) and/or a second authentication identifier (e.g. token, etc.) for uniquely identifying the user's account. The GUI 900 may also provide a link allowing a user to retrieve a forgotten password and a link allowing a new user to create a user account. The GUI 900 may be utilized by a sender of a money transfer or a receiver of a money transfer for logging in to a respective account.

Figure 10:
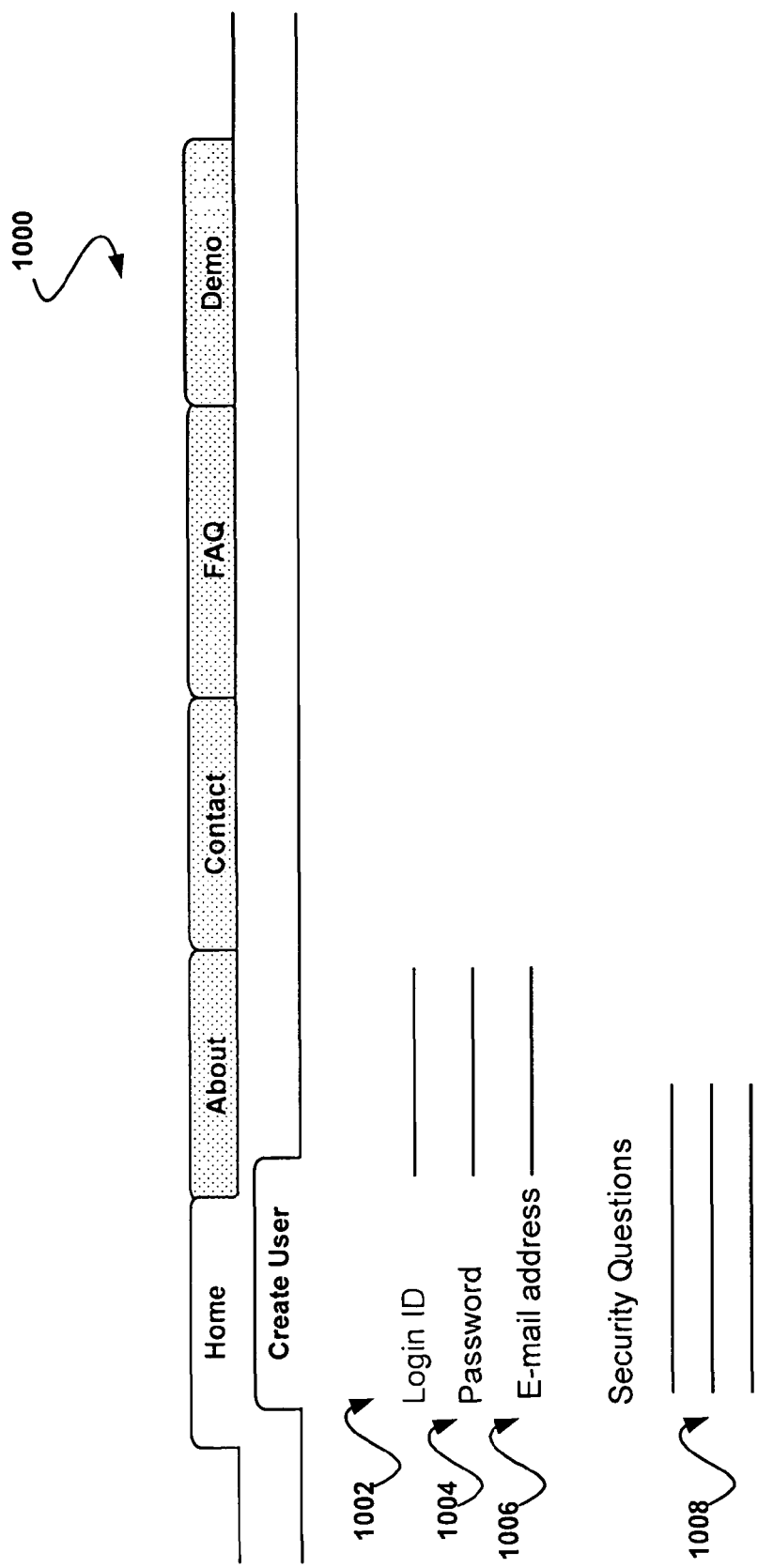
FIG. 10 shows a graphical user interface for creating a user account that utilizes pseudo account identifiers, in accordance with yet another embodiment.

FIG. 10 shows a graphical user interface (GUI) 1000 for creating a user account that utilizes pseudo account identifiers, in accordance with yet another embodiment. The GUI 1000 may be provided in response a user selecting an option to create a new user account. For example, the GUI 1000 may be displayed to the user in response to the link for a new account described with respect to FIG. 9. As shown, the GUI 1000 may allow a user to create an identifier 1002, a password 1004, an email address 1006 to be associated with the user account, and security questions/answers 1008 that may be utilized for retrieving a forgotten password. In this way, a sender and/or receiver of a money transfer may utilize the GUI 1000 to create a new account for respectively sending and/or receiving a money transfer.

Figure 11:
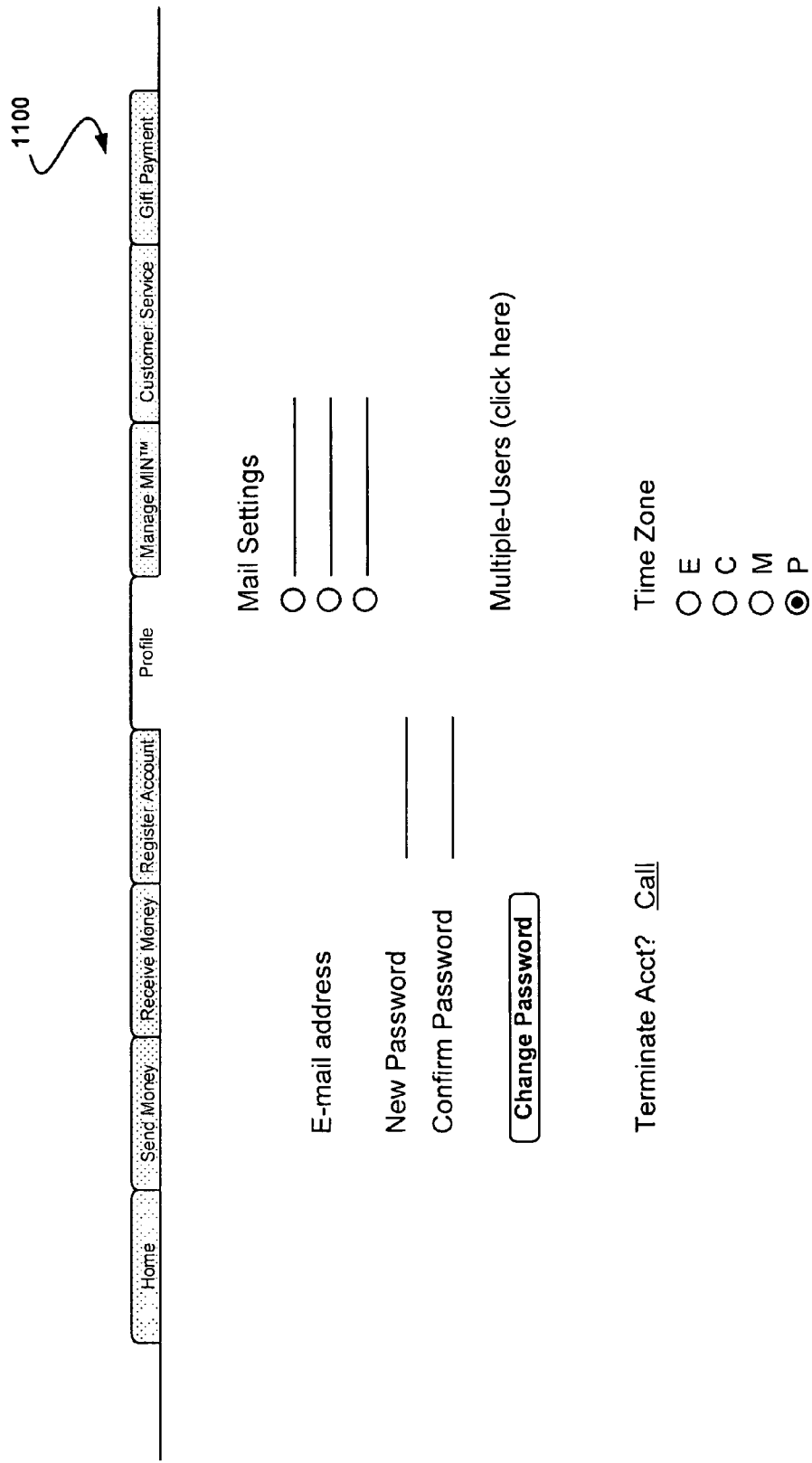
FIG. 11 shows a graphical user interface for configuring a user account that utilizes pseudo account identifiers, in accordance with still yet another embodiment.

FIG. 11 shows a graphical user interface (GUI) 1100 for configuring a user account that utilizes pseudo account identifiers, in accordance with still yet another embodiment. As shown, the GUI 1100 may include field for configuring settings associated with a user account. Specifically, the GUI 1100 may allow a user to customize an email address associated with the account, notification settings, a new password for logging in to the account, additional users associated with the account and/or any other settings capable of being associated with the account.

Figure 12:
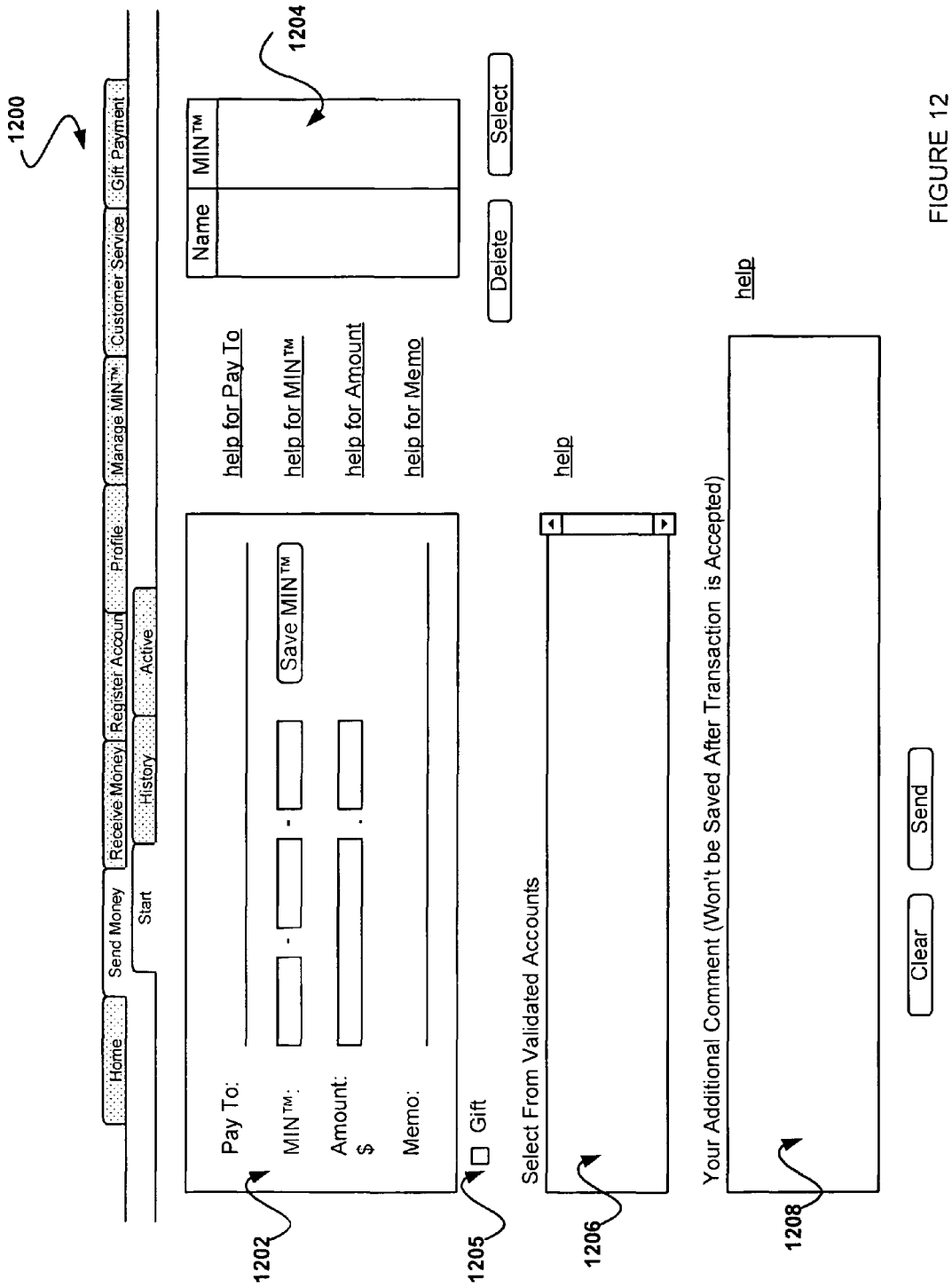
FIG. 12 shows a graphical user interface for initiating the sending of money utilizing a pseudo account identifier, in accordance with another embodiment.

FIG. 12 shows a graphical user interface (GUI) 1200 for initiating the sending of money utilizing a pseudo account identifier, in accordance with another embodiment. A sender may initiate a money transfer to a receiver utilizing the GUI 1200. If the sender has not yet logged in to an associated user account, the sender may optionally be required to login to the user's associated user account in order to initiate the money transfer. Of course the sender may also initiate a money transfer without being required to have or login to a user account. The GUI 1200 may allow the sender enter payment information via a payment field, where the payment information includes, for example, a name of the receiver, a pseudo account identifier associated with the receiver, and a monetary amount to be transferred to the receiver.

The GUI 1200 may also provide a selection field 1204 from which a sender may select a name and associated pseudo account identifier from a list of saved names and associated pseudo account identifiers. In addition, a gift field 1205 may be selected by a sender for indicating that the money transfer is a gift to the receiver. Still yet, an account field 1206 may be provided by which the sender may select an account from which the money transfer is to be made. Furthermore, a comment field 1208 may be provided for the sender to include a comment with the money transfer request being made.

FIG. 13 shows a graphical user interface (GUI) 1300 for confirming a money transfer, in accordance with yet another embodiment. The GUI 1300 may be presented to a sender of a money transfer request upon initiation of a money transfer, such as for example that described above with respect to FIG. 12. The GUI 1300 may include a confirmation message with information such as the sender's account from which the money is to be transferred, a monetary amount to be transferred, a transaction number associated with the transfer, and/or any other information capable of being associated with a requested money transfer. Thus, the sender may be allowed to confirm the money transfer information prior to fully initiating the money transfer.

Figure 14:
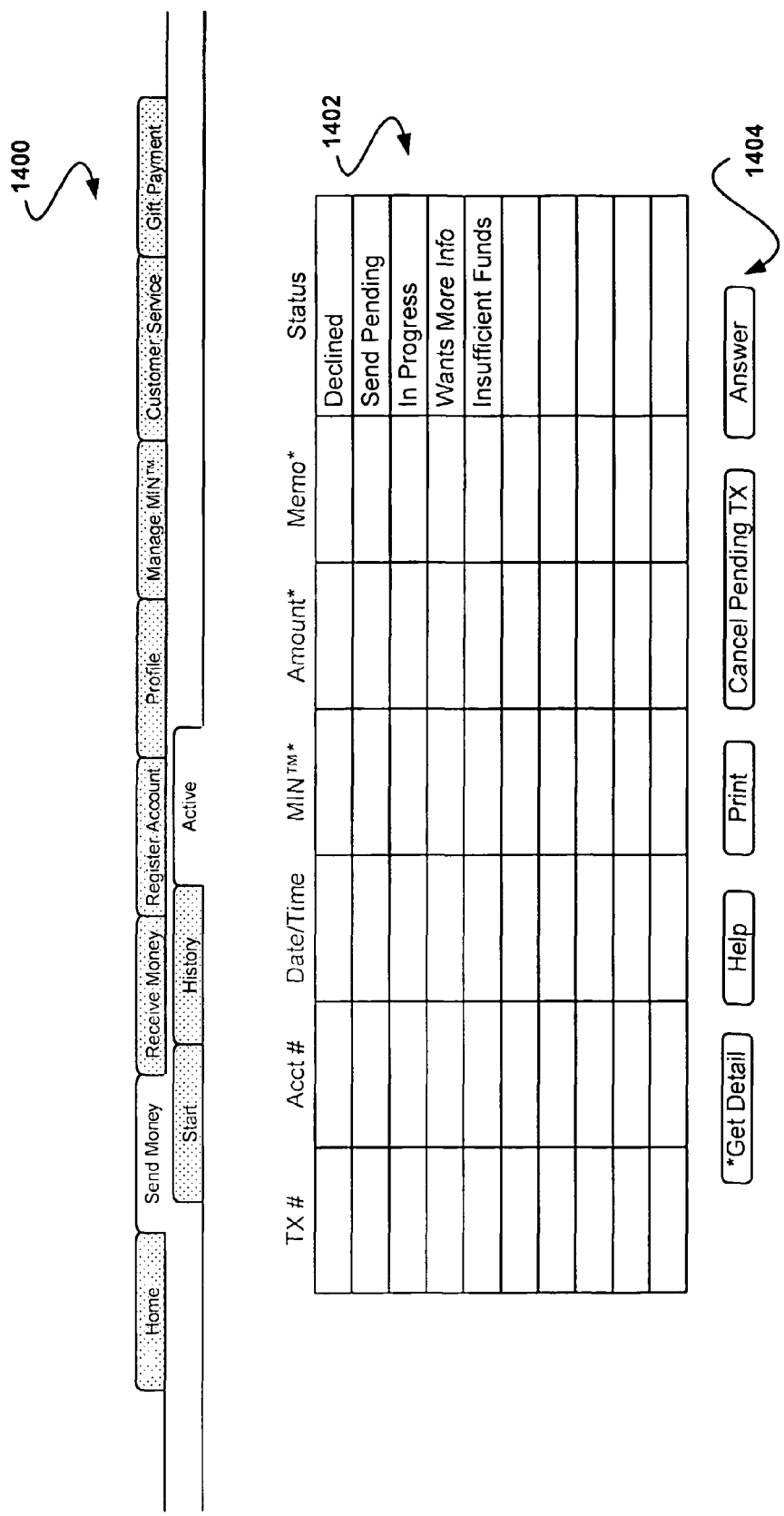
FIG. 14 shows a graphical user interface for displaying a list of active money transfers, in accordance with still yet another embodiment.

FIG. 14 shows a graphical user interface (GUI) 1400 for displaying a list of active money transfers, in accordance with still yet another embodiment. The GUI 1400 may be displayed to a sender of a money transfer utilizing a user account of the sender. The GUI 1400 may display a list of all active money transfers that have not yet been completed. As shown, a status 1402 of each active request may be displayed. Such status may include, but is not limited to, a declined status, a send pending status, an in progress status, an insufficient funds status and/or any other status capable of being associated with an active money transfer.

In addition, a more information status may be provided if a receiver of the associated money transfer requests more information before accepting the money transfer. If a more information status is present in a GUI 1400 associated with the sender, then the sender may select an answer button 1404 to reply to the receiver's request for more information. Such reply will be described in more detail with respect to FIG. 15.

In addition, the GUI 1400 may allow a user to view more details associated with a particular money transfer located in the displayed list. In addition, the user may be allowed to cancel money transfers located in the displayed list. Of course the cancel option may be limited to money transfers of only specific statuses. The GUI 1400 may also allow the user print the displayed list.

Figure 15:
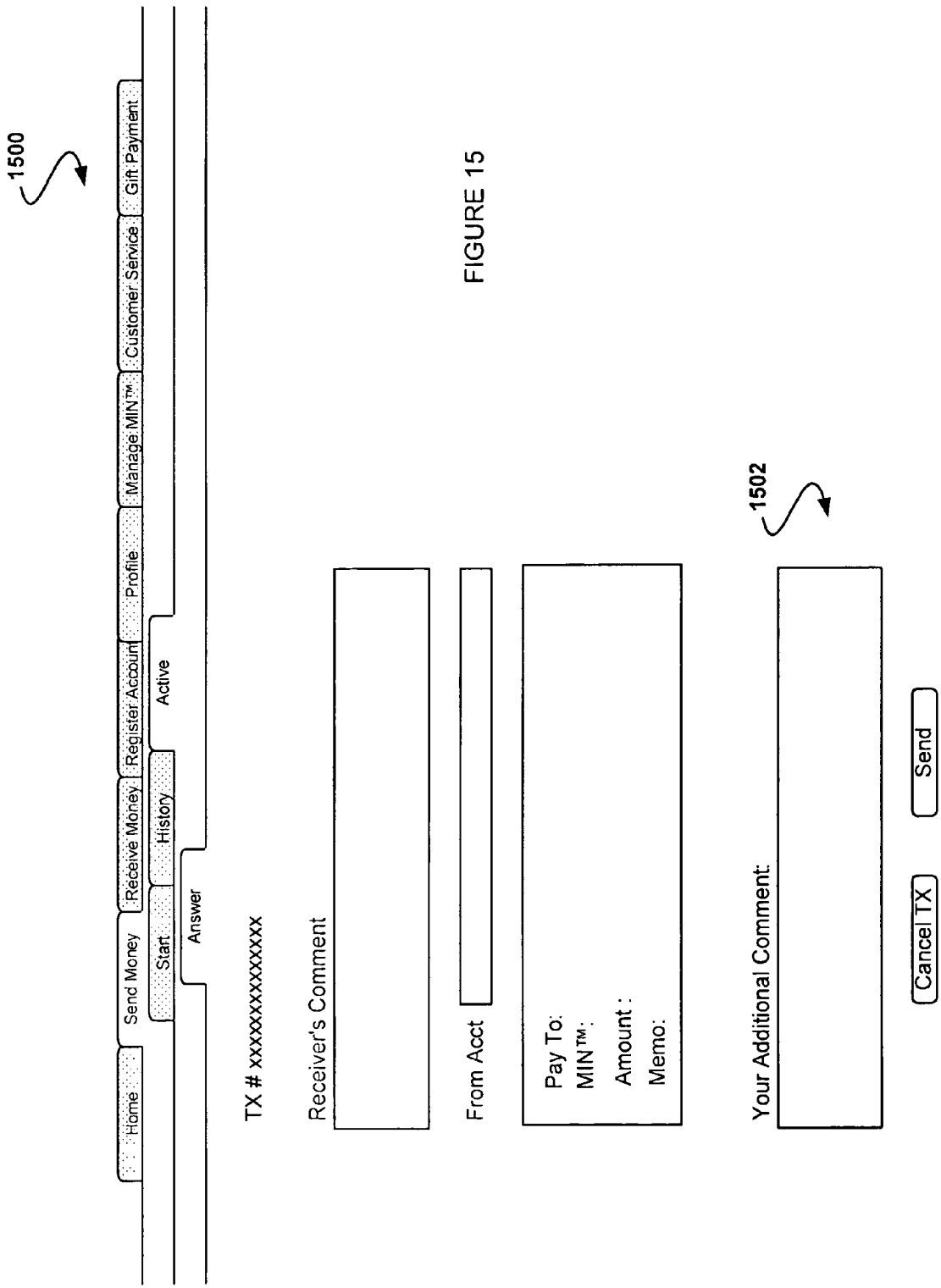
FIG. 15 shows a graphical user interface for providing additional information by a sender of a money transfer per a request by a receiver of the money transfer, in accordance with another embodiment.

FIG. 15 shows a graphical user interface (GUI) 1500 for providing additional information by a sender of a money transfer per a request by a receiver of the money transfer, in accordance with another embodiment. As described above with respect the GUI 1400 in FIG. 14 a sender may be allowed to respond to an additional information request made by a receiver utilizing an additional comment field 1502. The GUI 1500 may also provide fields with the receiver's request for additional information along with details specific to the money transfer.

FIG. 16 shows a graphical user interface (GUI) 1600 for displaying a history of completed money transfers, in accordance with yet another embodiment. The GUI 1600 may allow a sender to view completed transactions within specified dates. The GUI 1600 may also allow a sender to select to view additional information associated with a specific money transfer displayed in the history list.

Figure 17:
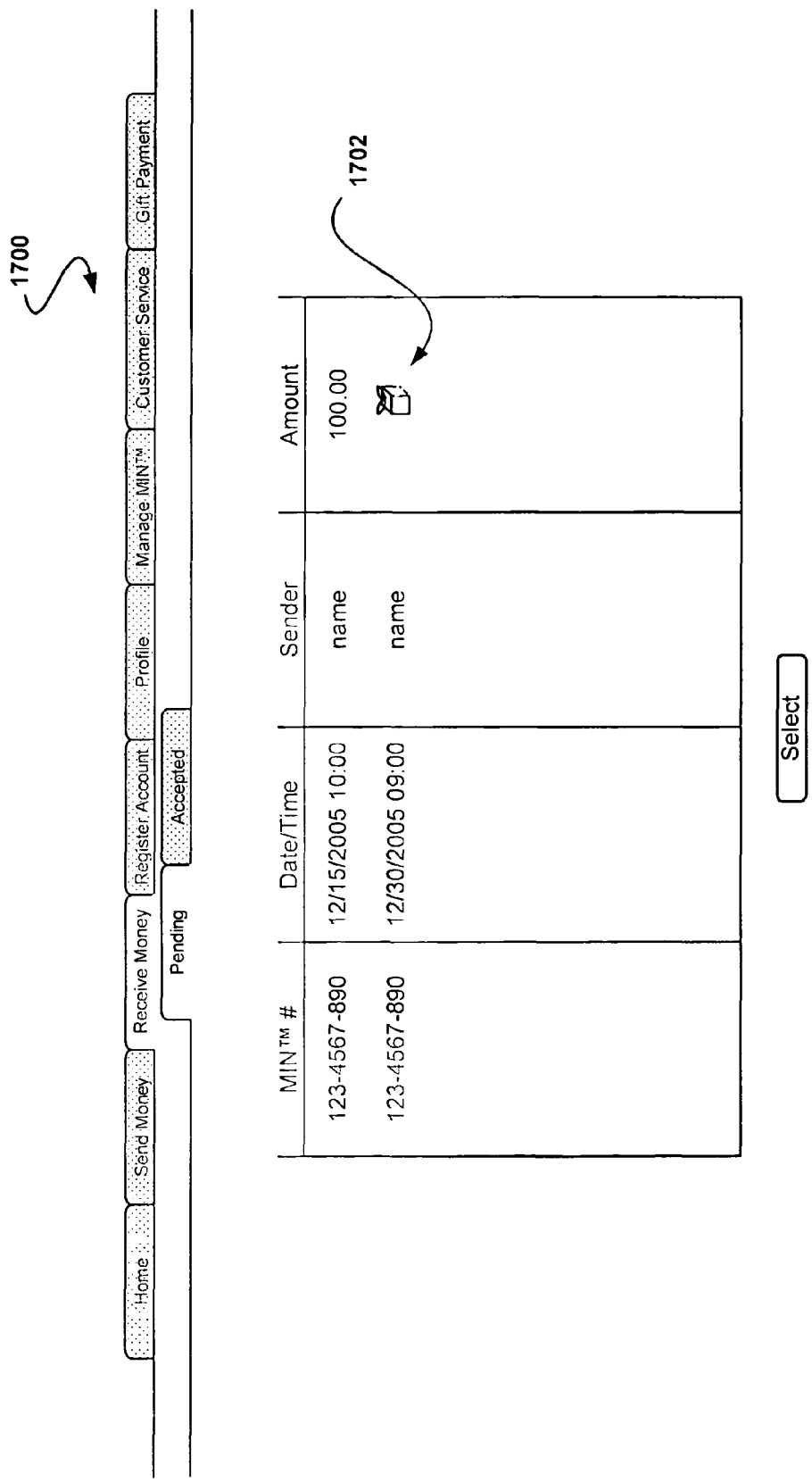
FIG. 17 shows a graphical user interface for displaying money transfers that are pending receipt, in accordance with still yet another embodiment.

FIG. 17 shows a graphical user interface (GUI) 1700 for displaying money transfers that are pending receipt, in accordance with still yet another embodiment. The GUI 1700 may be displayed to a receiver of the pending money transfers. The GUI 1700 may also display an amount of each pending money transfer, including a gift icon 1702 for money transfers that are selected by senders to be gifts. The GUI 1700 may also allow a receiver of the pending money transfer to select to view additional details associated with a particular pending money transfer.

Figure 18:
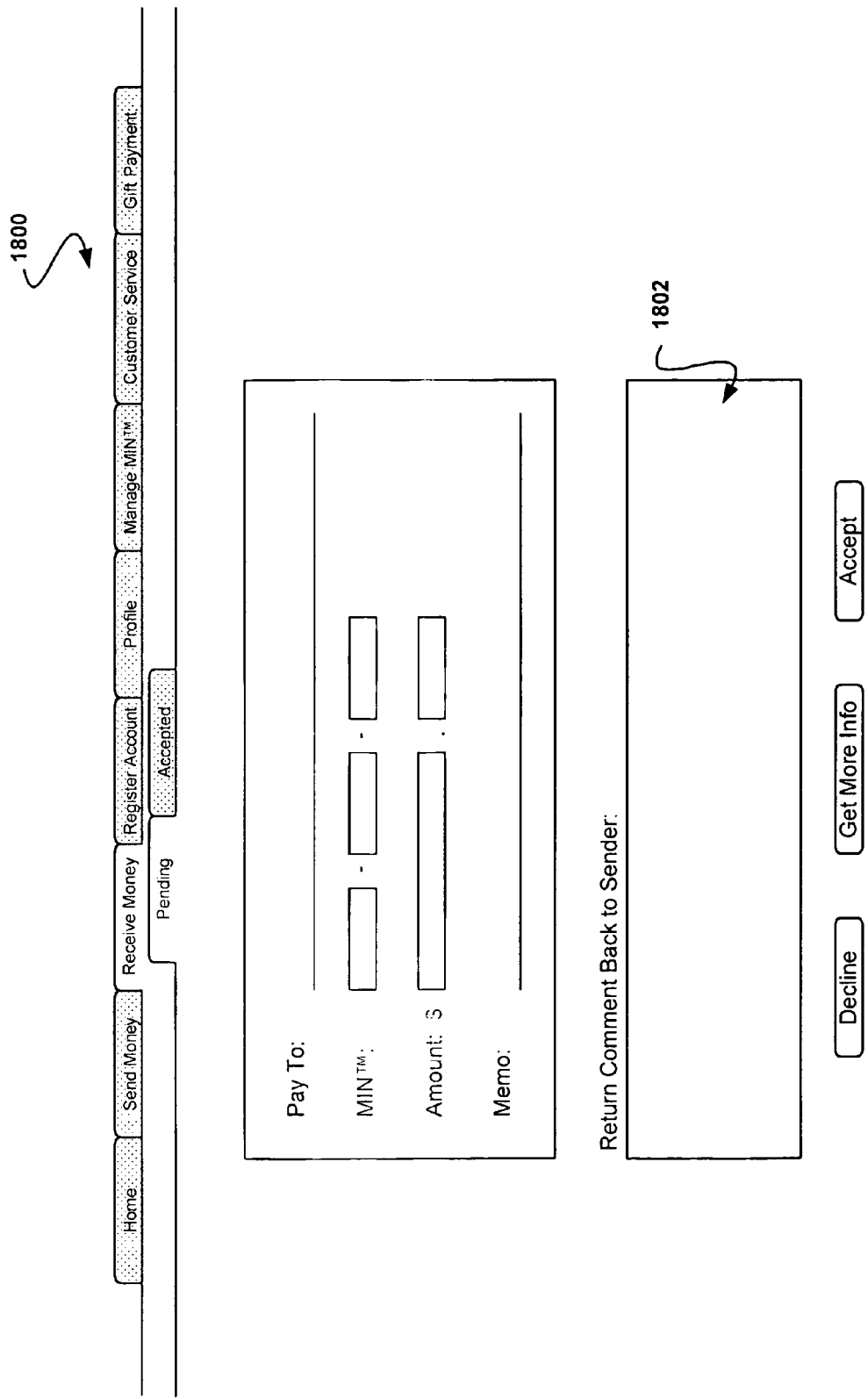
FIG. 18 shows a graphical user interface for receiving a response from a receiver in association with a pending money transfer, in accordance with another embodiment.

FIG. 18 shows a graphical user interface (GUI) 1800 for receiving a response from a receiver in association with a pending money transfer, in accordance with another embodiment. The GUI 1800 may be provided to a receiver of the money transfer upon the receiver selecting to view additional details associated with a particular pending money transfer, such as that described above with respect to FIG. 17. The GUI 1800 may allow a receiver to view details of the pending money transfer and to enter a comment, utilizing a comment field, to be sent to the sender of the associated money transfer. The GUI 1800 may also allow the receiver to decline the pending money transfer, thus cancelling the transfer, or to accept the pending money transfer without sending a comment to the sender.

Figure 19:
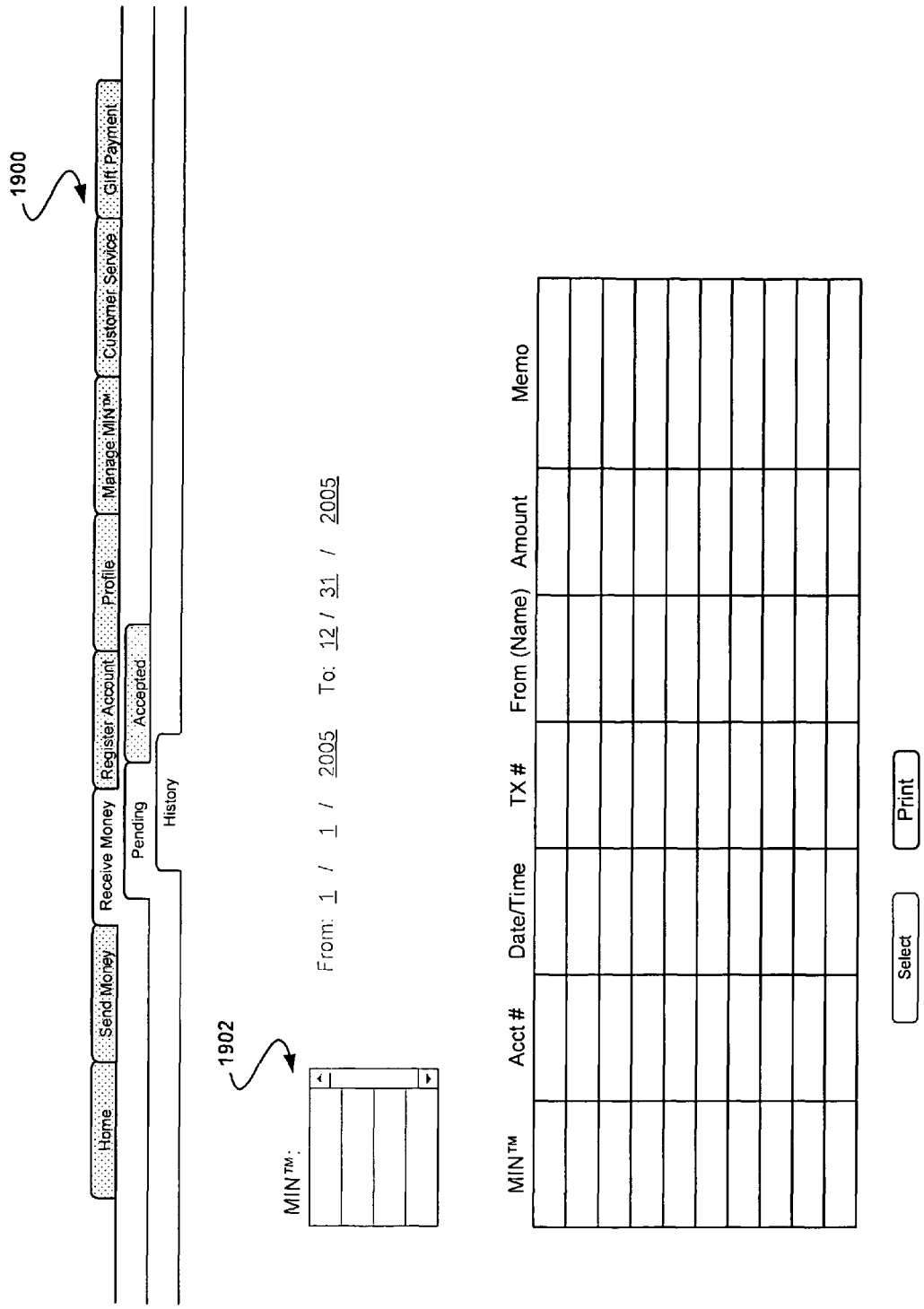
FIG. 19 shows a graphical user interface for displaying a history of accepted money transfers, in accordance with yet another embodiment.

FIG. 19 shows a graphical user interface (GUI) 1900 for displaying a history of accepted money transfers, in accordance with yet another embodiment. The GUI 1900 may be displayed to a receiver of money transfers, and may display a list of money transfers. The list of money transfers may include accepted money transfers, declined money transfers and/or any other desired money transfers of a particular status. The GUI 1900 may also allow the receiver to view histories of money transfers according to account by utilizing a user selection of an account from a list of available accounts 1902.

Figure 20:
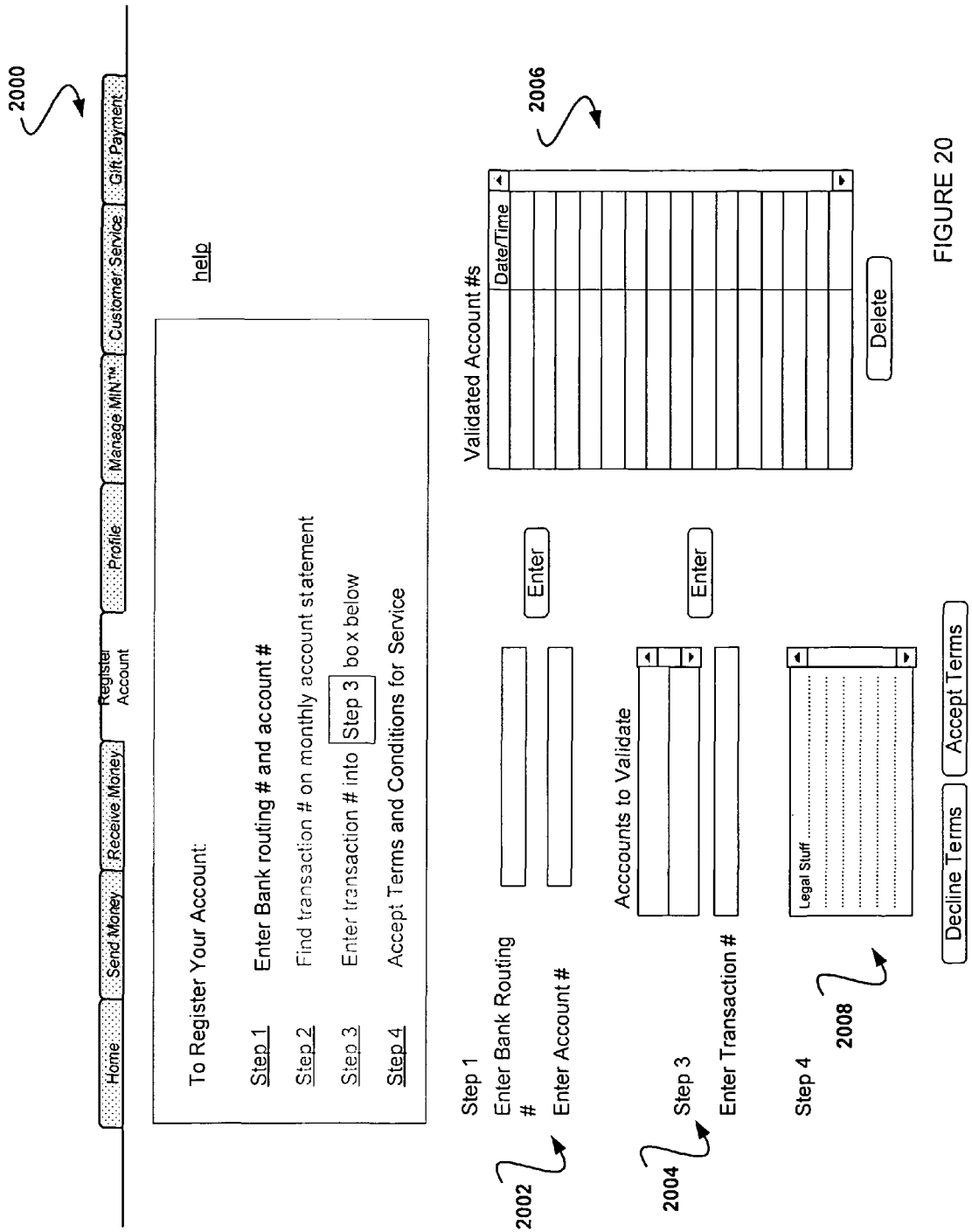
FIG. 20 shows a graphical user interface for registering a monetary account for use in association with a user account, in accordance with still yet another embodiment.

FIG. 20 shows a graphical user interface (GUI) 2000 for registering a monetary account for use in association with a user account, in accordance with still yet another embodiment. The GUI 2000 may provide instructions on how to register a monetary account. The GUI 2000 may also allow a user to enter monetary account information 2002, to validate entered monetary accounts 2004, to view a list validated monetary accounts 2006 and/or to accept a license agreement 2008 required to send and/or receive money transfers for at least one of the monetary accounts.

Figure 21:
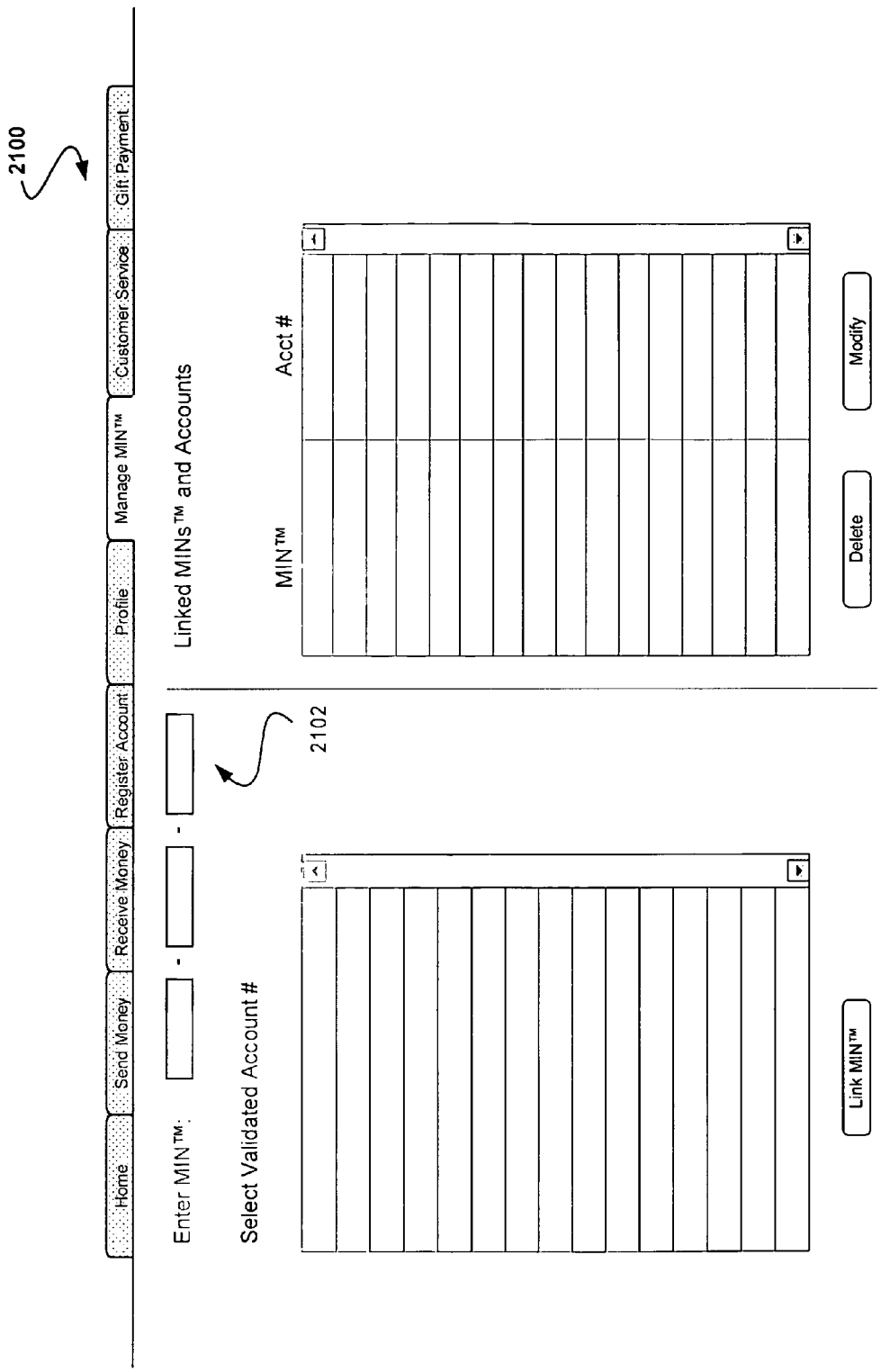
FIG. 21 shows a graphical user interface for associating pseudo account identifiers with registered monetary accounts, in accordance with another embodiment.

FIG. 21 shows a graphical user interface (GUI) 2100 for associating pseudo account identifiers with registered monetary accounts, in accordance with another embodiment. As shown, the GUI 2100 may allow a user to select validated monetary accounts and to associate such accounts with a pseudo account identifier entered into a field 2102. The GUI 2100 may also display a list of all validated monetary accounts and their associated pseudo account identifiers.

Figure 22:
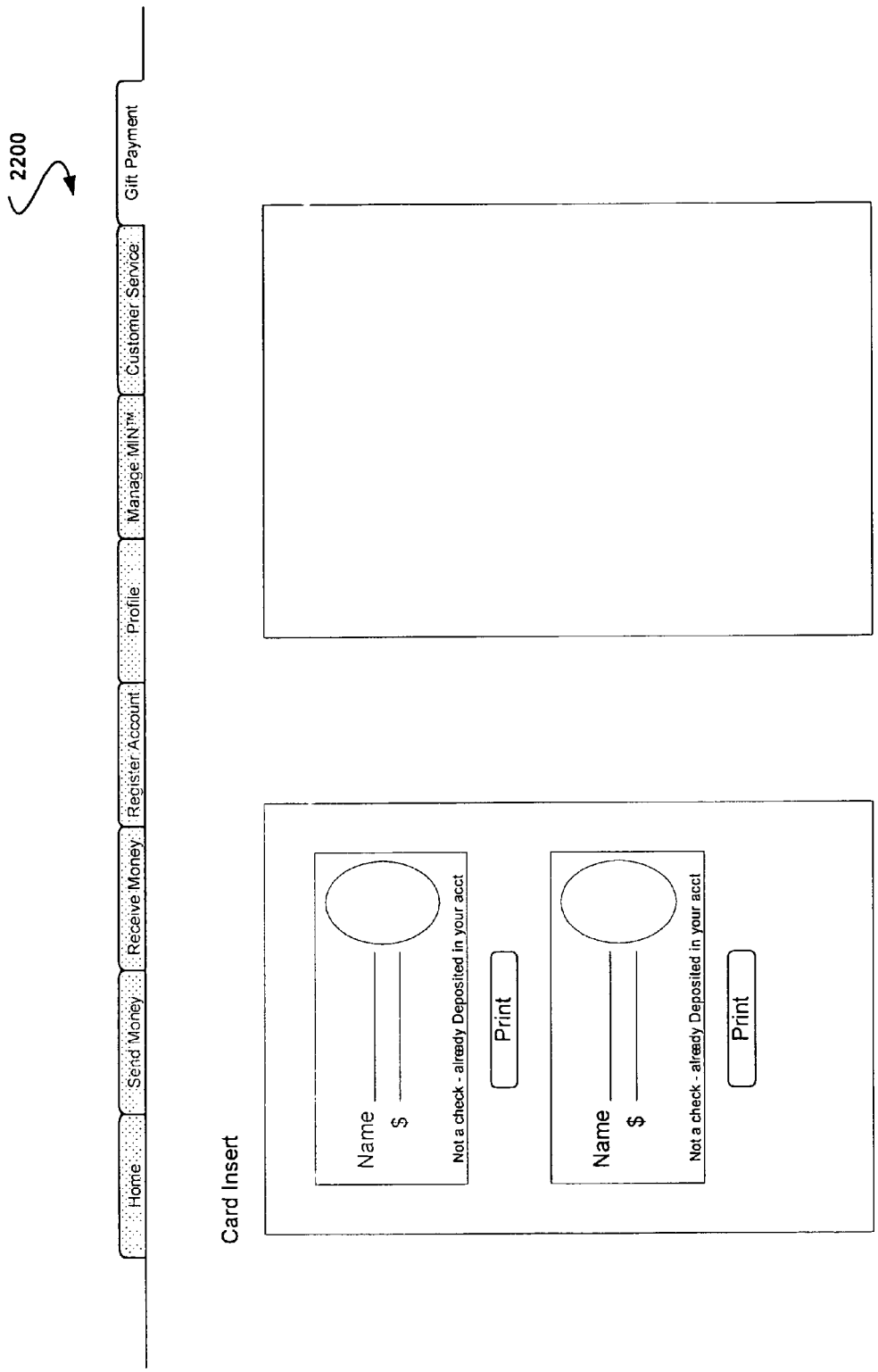
FIG. 22 shows a graphical user interface for displaying a gift money transfer document, in accordance with yet another embodiment.

FIG. 22 shows a graphical user interface (GUI) 2200 for displaying a gift money transfer document, in accordance with yet another embodiment. The GUI 200 may be displayed to a sender of a money transfer that is selected to be a gift for the receiver. Upon initiating payment, the sender may be provided with a gift coupon with the name of the receiver and the monetary amount of the money transfer. Thus, the sender may print the coupon and send the coupon to the receiver as a gift.

Figure 23:
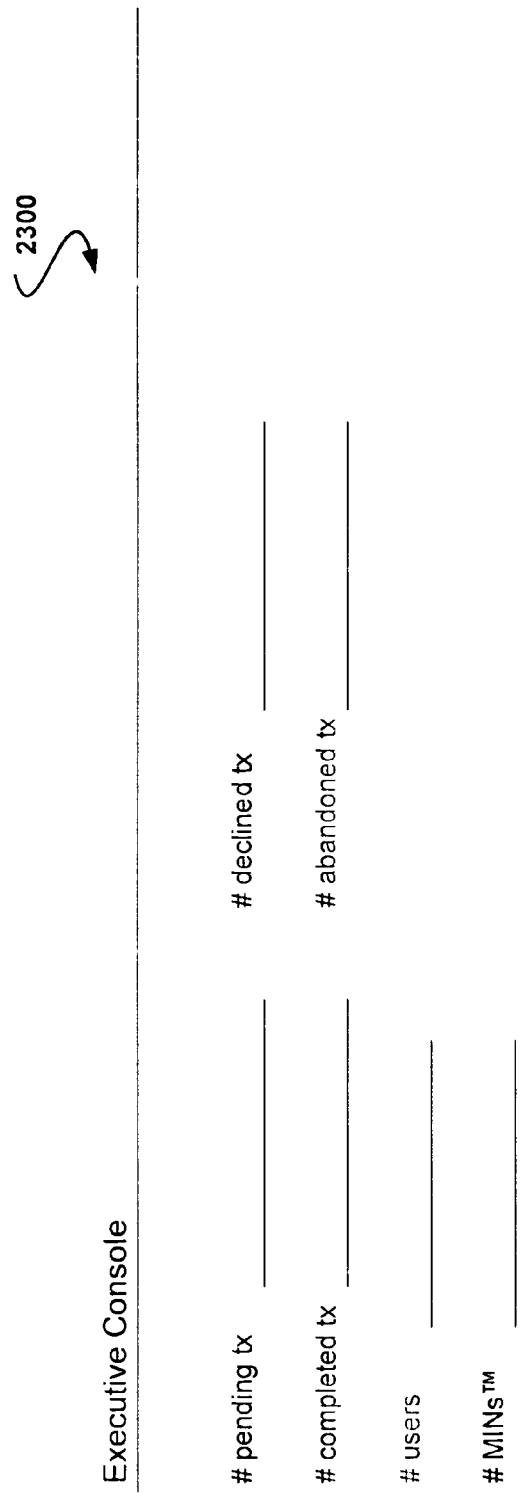
FIG. 23 shows a graphical user interface for reporting information associated with user accounts of a plurality of registered users, in accordance with still yet another embodiment.

FIG. 23 shows a graphical user interface (GUI) 2300 for reporting information associated with user accounts of a plurality of registered users, in accordance with still yet another embodiment. The GUI 2300 may allow an administrator to receive reports associated with money transfers initiated by a plurality of users. The reports may include information such as, pending money transfers, completed money transfers, users, pseudo account identifiers, declined money transfers, abandoned money transfers (e.g. due to timeout) and/or any other information capable of being associated with user accounts.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    computer code for creating a sender transfer service account for each of a plurality of senders utilizing a network, the sender transfer service account being created for a particular one of the senders by:
        receiving a sender password,
        receiving sender transfer service account information,
        receiving one or more actual sender bank account numbers including routing information and account information, the one or more actual sender bank account numbers associated with at least one first entity independent from a second entity associated with the sender transfer service account,
        causing a verification in connection with at least one aspect of the sender transfer service account by requiring the particular sender to verify a unique code intended for the particular sender, and
        storing the sender password, the sender transfer service account information, and the one or more actual sender bank account numbers in association with the sender transfer service account;
    computer code for creating a receiver transfer service account associated with the second entity for a receiver utilizing the network, by:
        receiving a receiver password,
        receiving receiver transfer service account information,
        receiving one or more actual receiver bank account numbers including routing information and account information, the one or more actual receiver bank account numbers associated with the at least one first entity independent from the second entity that is associated with the receiver transfer service account,
causing a verification in connection with at least one aspect of the receiver transfer service account by requiring the receiver to verify a unique code intended for the receiver, and
storing the receiver password, the receiver transfer service account information, and the one or more actual receiver bank account numbers in association with the receiver transfer service account;
computer code for receiving a request to transfer money in connection with the one or more actual sender bank account numbers of the particular sender and an actual receiver bank account number of a receiver, where the request to transfer money is administered, at least in part, by the second entity without requiring disclosure of the one or more actual sender bank account numbers to the receiver and without requiring disclosure of the actual receiver bank account number to the particular sender, by:
logging in the particular sender utilizing the sender password,
receiving receiver transfer service account information that does not include the actual receiver bank account number,
receiving a monetary amount to be transferred from the one or more actual sender bank account numbers of the particular sender to the actual receiver bank account number of the receiver, and
receiving a selection of at least one of the one or more actual sender bank account numbers of the particular sender;
computer code for sending an alert to the receiver utilizing at least one of an e-mail alert or a phone alert;
computer code for receiving requests from the senders including the particular sender utilizing the network, each request for transferring money from a first account associated with a corresponding sender to a second account associated with the receiver;
computer code for allowing acceptance of the request to transfer money in connection with the one or more actual sender bank account numbers of the particular sender and the actual receiver bank account number of the receiver, where the acceptance of the request is administered, at least in part, by the second entity without requiring disclosure of the one or more actual sender bank account numbers to the receiver and without requiring disclosure of the actual receiver bank account number to the particular sender, by:
logging in the receiver utilizing the receiver password,
displaying a queue of the requests to the receiver, the requests including the display of the request from the particular sender including the sender transfer service account information and the monetary amount,
receiving a selection of the request from the particular sender, and
receiving a selection of at least one of the one or more actual receiver bank account numbers of the receiver, and
causing a direct transfer of the money to an account associated with the one or more actual receiver bank account numbers of the receiver;
wherein the computer program product is operable such that the first account and the second account are each associated with the at least one first entity independent from the second entity, where the second entity performs the receiving the request and the displaying the queue associated with the computer code for receiving and displaying.

2. A system, comprising:
at least one computer with software installed thereon configured for:
creating a sender transfer service account for each of a plurality of senders utilizing a network, the sender transfer service account being created for a particular one of the senders by:
receiving a sender password,
receiving sender transfer service account information,
receiving one or more actual sender bank account numbers including routing information and account information,
causing a verification in connection with at least one aspect of the sender transfer service account by requiring the particular sender to verify a unique code intended for the particular sender, and
storing the sender password, the sender transfer service account information, and the one or more actual sender bank account numbers in association with the sender transfer service account; creating a receiver transfer service account associated with a second entity for a receiver utilizing the network, by:
receiving a receiver password,
receiving receiver transfer service account information,
receiving one or more actual receiver bank account numbers including routing information and account information, the one or more actual receiver bank account numbers associated with at least one first entity independent from the second entity that is associated with the sender transfer service account and the receiver transfer service account,
causing a verification in connection with at least one aspect of the receiver transfer service account by requiring the receiver to verify a unique code intended for the receiver, and
storing the receiver password, the receiver transfer service account information, and the one or more actual receiver bank account numbers in association with the receiver transfer service account;
receiving a request to transfer money in connection with the one or more actual sender bank account numbers of the particular sender and an actual receiver bank account number of a receiver, where the request to transfer money is administered, at least in part, by the second entity without requiring disclosure of the one or more actual sender bank account numbers to the receiver and without requiring disclosure of the actual receiver bank account number to the particular sender, by:
logging in the particular sender utilizing the sender password,
receiving at least a portion of the receiver transfer service account information that does not include the actual receiver bank account number,
receiving a monetary amount to be transferred from the one or more actual sender bank account numbers of the particular sender to the actual receiver bank account number of the receiver, and
receiving a selection of at least one of the one or more actual sender bank account numbers of the particular sender;
sending an alert to the receiver utilizing at least one of an e-mail alert or a phone alert; and
allowing acceptance of the request to transfer money in connection with the one or more actual sender bank account numbers of the particular sender and the actual receiver bank account number of the receiver, where the acceptance of the request is administered, at least in part, by the second entity without requiring disclosure of the one or more actual sender bank account numbers to the receiver and without requiring disclosure of the actual receiver bank account number to the particular sender, by:

logging in the receiver utilizing the receiver password, displaying a queue of requests to the receiver, the requests including the request to transfer money of the particular sender, the displaying including a display of the sender transfer service account information and the monetary amount, receiving a selection of the request to transfer money of the particular sender, and receiving a selection of at least one of the one or more actual receiver bank account numbers of the receiver;

wherein the system is operable such that the money is capable of being directly transferred to a bank account associated with the one or more actual receiver bank account numbers of the receiver, without requiring disclosure of the one or more actual sender ban account numbers to the receiver and without requiring disclosure of the actual receiver bank account number to the particular sender.

3. The computer program product of claim 1, wherein the receiver is selected from a group consisting of an individual, a business, and a government entity.

4. The computer program product of claim 1, wherein the computer program product is operable such that the requests are displayed in the queue with information selected from a group consisting of a name of the sender, an address of the sender, an amount of the money, a timestamp, and a message.

5. The computer program product of claim 1, wherein the computer program product is operable such that the requests are displayed in the queue with information including a name of the sender, an address of the sender, an amount of the money, a timestamp, and a message.

6. The computer program product of claim 1, wherein the computer program product is operable such that the requests are displayed in the queue with information including at least a name of the sender, and an amount of the money.

7. The computer program product of claim 1, wherein the computer program product is operable such that the requests are displayed in the queue with information including at least a name of the sender, an amount of the money, a timestamp, and a message.

8. The computer program product of claim 1, wherein the computer program product is operable such that a plurality of queues are displayed which are each assigned a unique identifier.

9. The computer program product of claim 1, wherein each request includes a pseudo account identifier associated with the receiver.

10. The computer program product of claim 9, wherein the pseudo account identifier is not an e-mail address associated with the receiver.

11. The computer program product of claim 9, wherein the pseudo account identifier is an e-mail address associated with the receiver.

12. The computer program product of claim 1, wherein the computer program product is operable such that the requests are displayed in a plurality of queues.

13. The computer program product of claim 12, wherein each queue in the plurality of queues is associated with a single pseudo account identifier.

14. The computer program product of claim 1, wherein the computer program product is operable such that the transfer is completed in response to an acceptance received from the receiver utilizing the network.

15. The computer program product of claim 14, wherein the computer program product is operable such that at least one request is dismissed after a predetermined amount of time without receiving the acceptance.

16. The computer program product of claim 1, wherein the computer program product is operable such that the transfer is carried out automatically.

17. The computer program product of claim 1, and further comprising computer code for attaching a document to the request.

18. The computer program product of claim 1, and further comprising computer code for logging in the receiver utilizing receiver login data.

19. The computer program product of claim 18, wherein a single set of the receiver login data is associated with a plurality of accounts associated with the receiver.

20. The computer program product of claim 1, wherein the computer program product is operable such that a status of each of the requests is displayed, the status including a pending status.

21. The computer program product of claim 1, wherein displaying the queue of the requests to the receiver includes displaying at least one request made by an anonymous sender.

22. The computer program product of claim 1, wherein displaying the queue of the requests to the receiver includes displaying a gift icon in association with at least one request.

23. The computer program product of claim 1, wherein the computer program product is operable such that at least one of the requests is automatically initiated.

24. The computer program product of claim 1, wherein the first account associated with the sender and the second account associated with the receiver are each associated with a different entity.

25. The computer program product of claim 1, wherein the first account associated with the sender and the second account associated with the receiver are each associated with a same entity.

26. The computer program product of claim 1, wherein the at least one first entity is separate from the second entity.

27. The computer program product of claim 1, wherein the second entity includes an entity that processes the requests.

28. The computer program product of claim 1, wherein the second entity includes an external entity.

29. The computer program product of claim 1, wherein at least one of the at least one first entity includes a business entity.

30. The computer program product of claim 1, wherein the computer program product is operable such that the queue of the requests is displayed utilizing a single interface.

31. The computer program product of claim 1, wherein the computer program product is operable such that the queue of the requests is displayed utilizing a list.

32. The computer program product of claim 1, wherein the computer program product is operable such that the queue of the requests includes a historical queue of requests.

33. The computer program product of claim 1, wherein the computer program product is operable such that the queue of the requests includes a queue of the requests with each request displayed with an associated status.

34. The computer program product of claim 1, and further comprising: computer code for displaying a selection mechanism from which at least one sender is capable of selecting a name of the receiver from a list of saved names in connection with at least one request.

35. The computer program product of claim 1, and further comprising: computer code for initiating a communication from the receiver to at least one of the senders via an interface that displays an associated request.

36. The computer program product of claim 35, and further comprising: computer code for initiating a response to the communication from the at least one sender to the receiver via another interface that displays the communication and information corresponding with the associated request.

37. The computer program product of claim 1, and further comprising: computer code for initiating a communication from the receiver to at least one of the senders via a web interface that displays at least one request.

38. The computer program product of claim 37, and further comprising: computer code for initiating a response to the communication from the at least one sender to the receiver via another interface that displays the communication and request information.

39. The computer program product of claim 1, wherein the computer code for receiving, the computer code for displaying, and the computer code for transferring are associated with a web application executed utilizing at least one server having at least one processor.

40. The system of claim 2, wherein the receiver is an individual.

41. The system of claim 2, wherein the system is operable such that the requests are displayed in the queue with information including at least a name or address of the sender, an amount of the money, and a message.

42. The system of claim 2, wherein the system is operable such that the requests are displayed in the queue with information including at least one of a name of the sender, an address of the sender, an amount of the money, a timestamp, or a message.

43. The system of claim 2, wherein the system is operable such that the requests are displayed in the queue with information including at least a name of the sender, and an amount of the money.

44. The system of claim 2, wherein the system is operable such that the requests are displayed in the queue with information including at least a name of the sender, an amount of the money, a timestamp, and a message.

45. The system of claim 2, wherein the system is operable such that a plurality of queues is displayed which are each assigned a unique identifier.

46. The system of claim 2, wherein each request includes an identifier associated with the receiver.

47. The system of claim 46, wherein the identifier serves multiple purposes for the receiver.

48. The system of claim 46, wherein the identifier is an e-mail address associated with the receiver.

49. The system of claim 2, wherein the system is operable such that the requests are displayed in a plurality of queues.

50. The system of claim 49, wherein each queue in the plurality of queues is associated with a single pseudo account identifier.

51. The system of claim 2, wherein a plurality of pseudo account identifiers correspond with the single second account associated with the receiver.

52. The system of claim 2, wherein the system is operable such that the transfer is completed in response to an acceptance received from the receiver utilizing the network.

53. The system of claim 52, wherein the system is operable such that the request is dismissed after a predetermined amount of time without receiving the acceptance.

54. The system of claim 2, wherein the system is operable such that the transfer is carried out automatically without an acceptance received from the receiver in response to a corresponding request.

55. The system of claim 2, wherein the system is operable such that the transfer is carried out utilizing an automated clearinghouse.

56. The system of claim 2, and further comprising logic for logging in the receiver utilizing receiver login data.

57. The system of claim 56, wherein a single set of the receiver login data is associated with a plurality of accounts associated with the receiver.

58. The system of claim 56, wherein a single set of the receiver login data is associated with a plurality of queues.

59. The system of claim 2, wherein the system is operable such that the money is transferred directly from the first account to the second account without passing through one or more intermediate accounts.

60. The system of claim 2, and further comprising logic for logging in the sender utilizing sender login data.

61. The system of claim 2, wherein the system is operable such that a status of each of the requests is displayed, the status including a pending status.

62. The system of claim 2, wherein displaying the queue of the requests to the receiver includes displaying at least one request made by an anonymous sender.

63. The system of claim 2, wherein displaying the queue of the requests to the receiver includes displaying a gift icon in association with at least one request.

64. The system of claim 2, wherein the system is operable such that at least one of the requests is automatically initiated.

65. The system of claim 2, wherein the at least one first entity is separate from the second entity.

66. The system of claim 2, wherein the second entity includes an entity that processes the requests.

67. The system of claim 2, wherein the second entity includes an external entity.

68. The system of claim 2, wherein the second entity includes a business entity.

69. The system of claim 2, wherein the system is operable such that the queue of the requests is displayed utilizing a single interface.

70. The system of claim 2, wherein the system is operable such that the queue of the requests is displayed utilizing a list.

71. The system of claim 2, wherein the system is operable such that the queue of the requests includes a historical queue of requests.

72. The system of claim 2, wherein the system is operable such that the queue of the requests includes a queue of the requests with each request displayed with an associated status.

73. The system of claim 2, and further comprising:
logic for displaying a selector from which at least one sender is capable of selecting a name of the receiver from a list of saved names in connection with a corresponding request.

74. The system of claim 2, and further comprising: logic for logging in at least one sender utilizing a sender identifier and a sender personal identifier;
logic for, after logging in the at least one sender, receiving, from the at least one sender, a receiver identifier and a monetary amount;
logic for displaying a confirmation interface including the receiver identifier and the monetary amount;

logic for receiving, from the at least one sender, a confirmation via the confirmation interface;

logic, after receiving the confirmation, initiating communication of a message to the receiver;

logic for, after initiating the communication of the message to the receiver, logging in the receiver utilizing a receiver identifier and a receiver personal identifier; and logic for, after logging in the receiver, completing the transferring.

75. The system of claim 74, and further comprising: logic for displaying a selection mechanism from which at least one sender is capable of selecting a name of the receiver from a list of saved names in connection with at least one request.

76. The system of claim 74, wherein the system is operable such that a pseudo account identifier is received with the receiver identifier and the monetary amount.

77. The system of claim 2, and further comprising: logic for initiating a communication from the receiver to at least one of the senders via an interface that displays the queue of the requests.

78. The system of claim 77, and further comprising: logic for initiating a response to the communication from the at least one sender to the receiver via another interface that displays the communication and information associated with an associated request.

79. The system of claim 2, and further comprising: logic for initiating a communication from the receiver to at least one of the senders via a web interface that displays the queue of the requests.

80. The system of claim 79, and further comprising: logic for initiating a response to the communication from the at least one sender to the receiver via another web interface that displays the communication and information corresponding with an associated request.

81. The system of claim 2, wherein the system is operable such that a plurality of the requests is simultaneously displayed in the queue.

82. The system of claim 2, wherein the transferring includes initiation of a transfer.

83. The system of claim 2, wherein the transferring includes completion of a transfer.

84. The system of claim 2, and further comprising logic for providing a first graphical user interface for logging in, a second graphical user interface for creating a user account that utilizes a identifier, a third graphical user interface for configuring the user account, a fourth graphical user interface for initiating the transferring, a fifth graphical user interface for confirming a money transfer, a sixth graphical user interface for displaying a list of money transfers, a seventh graphical user interface for displaying a history of money transfers, an eighth graphical user interface for registering a monetary account for use in association with the user account, and a ninth graphical user interface for reporting information associated with multiple user accounts of multiple registered users.

85. The system of claim 2, wherein the queue is one of a plurality of hierarchical queues including at least one master queue and a plurality of sub-queues.

86. The system of claim 2, wherein the system is operable such that a particular request expires unless accepted within a predetermined time.

87. The system of claim 2, wherein the system is operable such that the sender transfer service account information includes at least one of an address, a name, or an identifier.

88. The system of claim 2, wherein the system is operable such that the receiver transfer service account information includes a pseudo account identifier.

89. The system of claim 2, wherein the system is operable such that the unique code includes a unique transaction code.

90. The system of claim 2, wherein the system is operable such that the at least one aspect includes the one or more actual sender bank account numbers.

91. The system of claim 2, wherein the system is operable such that the phone alert includes a SMS message.

92. The system of claim 2, wherein the system is operable such that the transfer of money from the one or more actual sender bank account numbers of the particular sender is directly sent to the actual receiver bank account number of the receiver.

93. The system of claim 2, wherein the system is operable such that the receiver transfer service account information includes a pseudo account identifier, for being used by the sender to request the transfer of money by receiving the pseudo account identifier from the sender and utilizing the pseudo account identifier to communicate information about the request to transfer money to the receiver.

94. The system of claim 2, wherein the system is operable such that the receiver transfer service account information includes a pseudo account identifier including an e-mail address, for being used by the sender to request the transfer of money by receiving the pseudo account identifier from the sender and utilizing the pseudo account identifier to communicate information about the request to transfer money to the receiver.

95. A computer program product embodied on a non-transitory computer readable medium, comprising:

code for creating a sender transfer service account for each of a plurality of senders utilizing a network, the sender transfer service account being created for a particular one of the senders by:

receiving a sender password, receiving sender transfer service account information, receiving one or more actual sender bank account numbers including routing information and account information, verifying at least one aspect of the sender transfer service account by prompting feedback from the particular sender, and storing the sender password, the sender transfer service account information, and the one or more actual sender bank account numbers in association with the sender transfer service account;

code for creating a receiver transfer service account associated with a second entity for a receiver utilizing the network, by:

receiving a receiver password, receiving receiver transfer service account information, receiving one or more actual receiver bank account numbers including routing information and account information, the one or more actual receiver bank account numbers associated with at least one first entity independent from a second entity that is associated with the sender transfer service account and the receiver transfer service account, verifying at least one aspect of the receiver transfer service account by prompting feedback from the receiver, and storing the receiver password, the receiver transfer service account information, and the one or more actual receiver bank account numbers in association with the receiver transfer service account;

code for receiving a request to transfer money in connection with the one or more actual sender bank account numbers of the particular sender and an actual receiver bank account number of a receiver, without requiring disclosure of the one or more actual sender bank account numbers to the receiver and without requiring disclosure of the actual receiver bank account number to the particular sender, by:
  logging in the particular sender utilizing the sender password,
  receiving at least a portion of the receiver transfer service account information,
  receiving a monetary amount to be transferred from the one or more actual sender bank account numbers of the particular sender to the actual receiver bank account number of the receiver, and
  receiving a selection of at least one of the one or more actual sender bank account numbers of the particular sender;
code for sending an alert to the receiver utilizing at least one of an e-mail alert or a phone alert; and
code for allowing acceptance of the request to transfer money in connection with the one or more actual sender bank account numbers of the particular sender and the actual receiver bank account number of the receiver, without requiring disclosure of the one or more actual sender bank account numbers to the receiver and without requiring disclosure of the actual receiver bank account number to the particular sender, by:
  logging in the receiver utilizing the receiver password,
  displaying a queue of requests to the receiver, the requests including the request to transfer money of the particular sender, the displaying including display of the sender transfer service account information and the monetary amount,
  receiving a selection of the request to transfer money of the particular sender, and
  receiving a selection of at least one of the one or more actual receiver bank account numbers of the receiver;
wherein the computer program product is operable such that the money is capable of being transferred to a bank account associated with the one or more actual receiver bank account numbers of the receiver directly, bank account-to-bank account, without requiring disclosure of the one or more actual sender bank account numbers to the receiver and without requiring disclosure of the actual receiver bank account number to the particular sender.

96. The computer program product of claim 95, wherein the computer program product is operable such that the receiver transfer service account information includes a pseudo account identifier, for being used by the sender to request the transfer of money by receiving the pseudo account identifier from the sender and utilizing the pseudo account identifier to communicate information about the request to transfer money to the receiver.

97. The computer program product of claim 95, wherein the computer program product is operable such that the receiver transfer service account information includes a pseudo account identifier including an e-mail address, for being used by the sender to request the transfer of money by receiving the pseudo account identifier from the sender and utilizing the pseudo account identifier to communicate information about the request to transfer money to the receiver.

98. A computer program product embodied on a non-transitory computer readable medium, comprising:
code for creating a first account for a first entity utilizing a network, by:
  receiving a first password,
  receiving first account information,
  identifying one or more actual first bank account numbers including routing information and account information, and
  storing the first password, the first account information, and the one or more actual first bank account numbers in association with the first account;
code for verifying at least one aspect in connection with the first account by requesting feedback from the first entity;
code for creating a second account for a second entity utilizing the network, by:
  receiving a second password,
  receiving second account information,
  identifying one or more actual second bank account numbers including routing information and account information, and
  storing the second password, the second account information, and the one or more actual second bank account numbers in association with the second account;
code for verifying at least one aspect in connection with the second account by requesting feedback from the second entity;
code for receiving a first request to transfer money in connection with at least one of the one or more actual first bank account numbers of the first entity and a receiver, without requiring disclosure of the at least one of the one or more actual first bank account numbers to the receiver and without requiring disclosure of an actual receiver bank account number of the receiver to the first entity, by:
  logging in the first entity utilizing the first password,
  receiving receiver information,
  receiving a first monetary amount to be transferred from the at least one of the one or more actual first bank account numbers of the first entity to the actual receiver bank account number of the receiver, and
  receiving a selection of the at least one of the one or more actual first bank account numbers of the first entity;
code for causing an alert to be sent to the receiver utilizing at least one of an e- mail alert or a phone alert; and
code for allowing acceptance of a second request to transfer money in connection with an actual sender bank account number of a sender and the second entity, without requiring disclosure of the actual sender bank account number to the second entity and without requiring disclosure of at least one of the one or more actual second bank account numbers of the second entity to the sender, by:
  logging in the second entity utilizing the second password,
  displaying a queue of one or more requests to the second entity, the one or more requests including the second request to transfer money of the sender, the displaying including display of a second monetary amount,
  receiving a selection in connection with the second request to transfer money of the sender, and
  receiving a selection of the at least one of the one or more actual second bank account numbers of the second entity;
wherein the computer program product is operable such that money is capable of being transferred directly from a first entity bank account associated with the at least one of the one or more actual first bank account numbers of the first entity to a receiver bank account associated with the actual receiver bank account number of the receiver, without requiring disclosure of the at least one of the one or more actual first bank account numbers to the receiver and without requiring disclosure of the actual receiver bank account number to the first entity;

wherein the computer program product is further operable such that money is capable of being transferred directly to a second entity bank account associated with the at least one of the one or more actual second bank account numbers of the second entity from a sender bank account associated with the actual sender bank account number of the sender, without requiring disclosure of the actual sender bank account number to the second entity and without requiring disclosure of the at least one of the one or more actual second bank account numbers to the sender.

99. The computer program product of claim 98, wherein the computer program product is operable such that the receiver information includes a pseudo account identifier which is used in connection with communication with the receiver regarding the first request to transfer money.

100. The computer program product of claim 98, wherein the computer program product is operable such that the receiver information includes a pseudo account identifier including an e-mail address, which is used in connection with communication with the receiver regarding the first request to transfer money.

101. The computer program product of claim 98, wherein the computer program product is operable such that the first account and the second account are associated with a same entity.

102. The computer program product of claim 98, wherein the computer program product is operable such that the first account, the second account, the receiver bank account, the sender bank, the first entity bank account, and the second entity bank account are associated with a same entity.

103. The computer program product of claim 98, wherein the computer program product is operable such that the at least one aspect is of the first account.

104. The computer program product of claim 98, wherein the computer program product is operable such that the receiver information includes information associated with a receiver account.

105. The computer program product of claim 98, wherein the computer program product is operable such that the actual first or second bank account numbers are associated with at least one first particular entity independent from a second particular entity that receives the first request to transfer money or allows acceptance of the second request to transfer money.

106. The computer program product of claim 98, wherein the computer program product is operable such that the actual first and second bank account numbers are associated with at least one first particular entity independent from a second particular entity that receives the first request to transfer money and allows acceptance of the second request to transfer money.

107. The computer program product of claim 98, wherein the computer program product is operable such that the actual first or second bank account numbers are associated with at least one first particular entity independent from a second particular entity that administers, at least in part, the receipt of the first request to transfer money or allowance of the acceptance of the second request to transfer money.

108. The computer program product of claim 98, wherein the computer program product is operable such that the actual first and second bank account numbers are associated with at least one first particular entity independent from a second particular entity that administers, at least in part, the receipt of the first request to transfer money or allowance of the acceptance of the second request to transfer money.

109. The computer program product of claim 98, wherein the computer program product is operable such that the first entity is the sender, and the second entity is the receiver.

110. The computer program product of claim 98, wherein the computer program product is operable such that the queue is displayed utilizing a list.

111. The computer program product of claim 98, wherein the computer program product is operable such that the queue includes a historical queue of requests.

112. The computer program product of claim 98, wherein the computer program product is operable such that the queue includes a list of the requests with each request displayed with an associated status.

113. The computer program product of claim 98, wherein the computer program product is operable such that the queue is one of a plurality of hierarchical queues including at least one master queue and a plurality of sub-queues.

114. The computer program product of claim 98, wherein the computer program product is operable such that the one or more requests are displayed in the queue with information including a name of the sender, an address of the sender, a timestamp, and a message.

115. The computer program product of claim 98, wherein the computer program product is operable such that a plurality of queues are displayed which are each assigned a unique identifier.

116. The computer program product of claim 98, wherein the computer program product is operable such that the receiving the selection of the at least one of the one or more actual first bank account numbers of the first entity includes a selection of at least one of a plurality of displayed actual first bank account numbers which are registered by the first entity.

117. The computer program product of claim 98, wherein the computer program product is operable such that the receiving the selection of the at least one of the one or more actual second bank account numbers of the second entity includes a selection of at least one of a plurality of displayed actual second bank account numbers which are registered by the second entity.

118. The computer program product of claim 98, wherein the computer program product is further operable such that, in response to the first request to transfer money, money is transferred to the receiver bank account without passing through one or more intermediate accounts utilizing an automated clearinghouse (ACH); and, in response to the second request to transfer money, money is transferred from the sender bank account without passing through one or more intermediate accounts utilizing the ACH.

119. The computer program product of claim 98, wherein the computer program product is operable such that the actual first and second bank account numbers are associated with at least one first particular entity independent from a second particular entity that receives the first request to transfer money and allows acceptance of the second request to transfer money, and the one or more actual second bank account numbers includes a single second bank account number.

* * * * *